United States Patent [19]

Leontiades

[11] 4,284,001
[45] Aug. 18, 1981

[54] HEAD IMAGE GENERATOR FOR A MATRIX PRINTER

[75] Inventor: Kyriakos L. Leontiades, Boca Raton, Fla.

[73] Assignee: International Business Machines Corp., Armonk, N.Y.

[21] Appl. No.: 86,493

[22] Filed: Oct. 19, 1979

[51] Int. Cl.³ .............................................. B41J 3/12
[52] U.S. Cl. .............................. 101/93.05; 364/900; 400/110; 400/124
[58] Field of Search .................... 400/110, 124, 121; 101/93.04, 93.05; 364/200 MS File, 900 MS File

[56] References Cited

U.S. PATENT DOCUMENTS

| | | | |
|---|---|---|---|
| 4,024,506 | 5/1977 | Spaargaren | 101/93.04 X |
| 4,146,922 | 3/1979 | Brown et al. | 400/124 X |
| 4,169,684 | 10/1979 | Blom | 400/124 |

Primary Examiner—Paul T. Sewell
Attorney, Agent, or Firm—Harry W. Barron; John C. Black; J. Jancin, Jr.

[57] ABSTRACT

A wire matrix printer has a plurality of heads, each consisting of nine wires arranged in a slanting format. The printer can be controlled to print Oriental type characters such as Japanese by loading a wire image map of the characters into a memory. The loading technique loads the memory in a slanted fashion corresponding to the slant of the print heads and reads from the memory in a bit column manner to correspond to the position of the various wires of the multihead print block. The loading and unloading of the wire image memory is controlled by a pair of microprocessors operating respectively on different halves of the memory, such that at any given time, half of the memory is being loaded while the other half is being read from. Thereafter, the memory is switched so that the loaded half is read and the previously read half is cleared and loaded with a new line of information.

31 Claims, 21 Drawing Figures

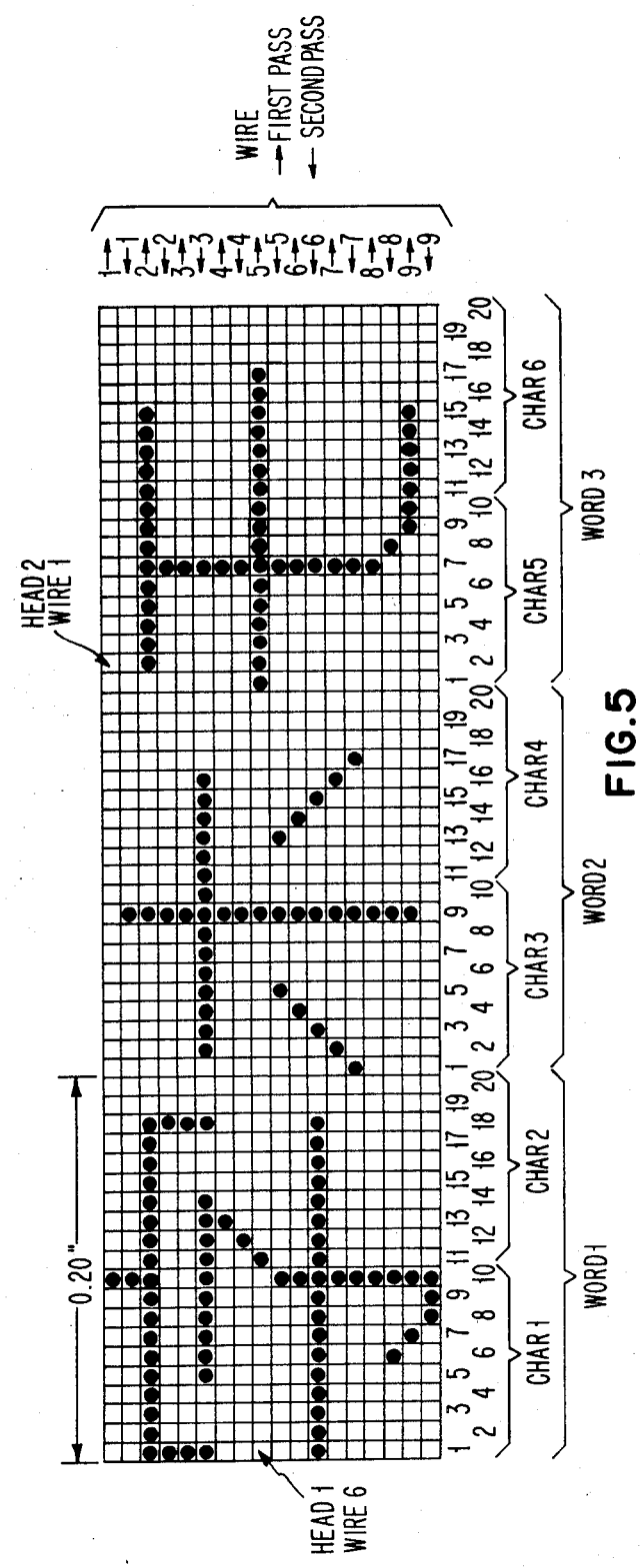

| | SLICE (2) | SLICE (1) | WIRE | 1 | 2 | 3 | 4 | 5 | 6 | 7 | 8 | |
|---|---|---|---|---|---|---|---|---|---|---|---|---|
| | | | | 1 | 2 | 3 | 4 | 5 | 6 | 7 | 8 | 9 | 10 |
| | | | | H8 | L2H6 | L4H4 | L6H2 | L8 | H8 | L2H6 | L4H4 | L6H2 | L8 |
| | | | | 000 | 048 | 090 | 0D8 | 120 | 168 | 1B0 | 1F8 | 240 | 288 |
| HEAD #1 | 2 12 4 14 6 16 8 18 10 | 1 11 3 13 5 15 7 17 9 | 1 6 2 7 3 8 4 9 5 | ∅ · · · · · · · 1 | ∅ · · · · · · ·1 ·2 | ∅ · · · · · · ·1 ·3 | ∅ · · · · · ·1 ·2 ·4 | · · · · · · · · · | ∅ · · · · · 1 ·5 | ∅ · · · · ·2 ·6 | ∅ · · · ·1 ·7 | ∅ · · ·2 ·8 | · · · · · · · · · |
| HEAD #2 | 2 12 4 14 6 16 8 18 10 | 1 11 3 13 5 15 7 17 9 | 1 6 2 7 3 8 4 9 5 | 5 7 9 11 13 15 17 19 21 | ·6 ·10 | ·7 ·9 ·23 | ·8 ·10 ·24 | · · · · · · · · · | ·9 ·23 | ·10 ·24 | ·11 ·23 | ·12 ·24 | · · · · · · · · · |
| HEAD #3 | 2 12 4 14 6 16 8 18 10 | 1 11 3 13 5 15 7 17 9 | 1 6 2 7 3 8 4 9 5 | 25 27 29 31 33 35 37 39 41 | ·26 | ·27 | ·28 | · · · · · · · · · | ·29 | ·30 | ·31 | ·32 | · · · · · · · · · |
| HEAD #4 | 2 12 4 14 6 16 8 18 10 | 1 11 3 13 5 15 7 17 9 | 1 6 2 7 3 8 4 9 5 | 45 47 49 51 53 55 57 59 61 | | | | · · · · · · · · · | | | | | · · · · · · · · · |

FIG. 14A

| 9 | 10 | 11 | 12 | 13 | 14 | 15 | 16 | 17 | 18 | 19 | 20 | CHARACTERS |
|---|---|---|---|---|---|---|---|---|---|---|---|---|
| 11 | 12 | 13 | 14 | 15 | 16 | 17 | 18 | 19 | 20 | 21 | 22 | 23 | 24 | 25 | BYTES |
| H8 | L2H6 | L4H4 | L6H2 | L8 | H8 | L2H6 | L4H4 | L6H2 | L8 | H8 | L2H6 | L4H4 | L2H2 | L8 | BITS |
| 200 | 313 | 360 | 3A8 | 3F0 | 438 | 480 | 4C8 | 510 | 558 | 5A0 | 5E8 | 630 | 678 | 6C0 | ADDRESS |
| ∅⋮1⋮9 | ∅⋮·2⋮·10 | ∅⋮·1⋮·9⋮·11 | ∅⋮·2⋮·10⋮·12 | · ⋮ · | ∅⋮1⋮·9⋮·13 | ∅⋮·2⋮·10⋮·14 | ∅⋮·1⋮·3⋮·9⋮·15 | ∅⋮·2⋮·4⋮·10⋮·16 | · ⋮ · | ·1⋮·3⋮·5⋮·9⋮·17 | ·2⋮·4⋮·6⋮·10⋮·18 | ·3⋮·5⋮·7⋮·9⋮·19 | ·4⋮·6⋮·8⋮·10⋮·12⋮·14⋮·16⋮·18⋮·20 | · ⋮ · |  |
| 13⋮23 | ·14⋮·24 | ·15⋮·23 | ·16⋮·24 | · | ·17⋮·23 | ·18⋮·24 | ·19⋮·23 | 20⋮24 | · | ·21⋮·23 | ·22⋮·24 | ·23 | ·24⋮·26⋮·28⋮·30⋮·32⋮·34⋮·36⋮·38⋮·40 | · |  |
| 33 | ·34 | ·35 | ·36 | · | ·37 | ·38 | ·39 | 40 | · | ·41 | ·42 | ·43 | ·44⋮·46⋮·48⋮·50⋮·52⋮·54⋮·56⋮·58⋮·60 | · |  |
|  |  |  |  | · |  |  |  |  | · |  |  |  | ·64⋮·66⋮·68⋮·70⋮·72⋮·74⋮·76⋮·78⋮·80 | · |  |

FIG. 14B

| | | | | | | | | | | | | |
|---|---|---|---|---|---|---|---|---|---|---|---|---|
| HEAD #5 | 2<br>12<br>4<br>14<br>6<br>16<br>8<br>18<br>10 | 1<br>11<br>3<br>13<br>5<br>15<br>7<br>17<br>9 | 1<br>6<br>2<br>7<br>3<br>8<br>4<br>9<br>5 | 65<br>67<br>69<br>71<br>73<br>75<br>77<br>79<br>81 | . | . | . | . | . | . | . | . |
| HEAD #6 | 2<br>12<br>4<br>14<br>6<br>16<br>8<br>18<br>10 | 1<br>11<br>3<br>13<br>5<br>15<br>7<br>17<br>9 | 1<br>6<br>2<br>7<br>3<br>8<br>4<br>9<br>5 | 85<br>87<br>89<br>91<br>93<br>95<br>97<br>99<br>101 | . | . | . | . | . | . | . | . |
| HEAD #7 | 2<br>12<br>4<br>14<br>6<br>16<br>8<br>18<br>10 | 1<br>11<br>3<br>13<br>5<br>15<br>7<br>17<br>9 | 1<br>6<br>2<br>7<br>3<br>8<br>4<br>9<br>5 | 105<br>107<br>109<br>111<br>113<br>115<br>117<br>119<br>121 | ·122 | ·121<br>·123 | ·122<br>·124 | . | . | ·121 ·122 | ·121 ·122 | . |
| HEAD #7 EXTENDED | 2<br>12<br>4<br>14<br>6<br>16<br>8<br>18<br>10 | 1<br>11<br>3<br>13<br>5<br>15<br>7<br>17<br>9 | 1<br>6<br>2<br>7<br>3<br>8<br>4<br>5<br>5 | 125<br>127<br>129<br>131<br>∅ | ·126<br>·128<br>·130<br>·132<br>∅ | ·127<br>·129<br>·131<br>∅ | ·128<br>·130<br>·132<br>∅ | . | ·129 ·130<br>·131 ·132<br>∅ ∅ | ·131 ·132<br>∅ ∅ | . |

FIG.15A (rotated table - patent figure)

FIG.15B

| CHARACTERS | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|
| BYTES | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 |
| BITS | H8 | L2H6 | L4H4 | L6H2 | L8 | H8 | L2H6 | L4H4 | L6H2 | L8 | H8 | L2H6 | L4H4 | L6H2 | L8 | H8 | L2H6 | L4H4 | L6 |
| ADDRESS | 384 | 3B1 | 3DE | 40B | 438 | 465 | 482 | 4BF | 4EC | 519 | 546 | 573 | 5A0 | 5CD | 5FA | 627 | 654 | 681 | 6AE | 6DB | 708 | 735 | 762 | 78F |
| | 1 | ·2 | ·3 | ·4 | · | 5 | ·6 | ·7 | ·8 | · | 9 | ·10 | ·11 | ·12 | · | 13 | ·14 | ·15 | ·16 | · | ·17 | ·18 | ·19 | · |
| | 3 | ·4 | ·5 | ·6 | · | 7 | ·8 | ·9 | ·10 | · | ·11 | ·12 | ·13 | ·14 | · | 15 | ·16 | ·17 | ·18 | · | ·19 | ·20 | ·21 | · |
| | 5 | ·6 | ·7 | ·8 | · | 9 | ·10 | ·11 | ·12 | · | 13 | ·14 | ·15 | ·16 | · | 17 | ·18 | ·19 | ·20 | · | | | ·23 | · |
| | 7 | ·8 | ·9 | ·10 | · | 11 | ·12 | ·13 | ·14 | · | 15 | ·16 | ·17 | ·18 | · | 19 | ·20 | | | · | | | ·25 | · |
| | 9 | ·10 | ·11 | ·12 | · | 13 | ·14 | ·15 | ·16 | · | 17 | ·18 | ·19 | ·20 | · | | | | | · | | | ·27 | · |
| | 11 | ·12 | ·13 | ·14 | · | 15 | ·16 | ·17 | ·18 | · | 19 | ·20 | | | · | | | | | · | | | ·29 | · |
| | 13 | ·14 | ·15 | ·16 | · | 17 | ·18 | ·19 | ·20 | · | | | | | · | | | | | · | | | ·31 | · |
| | 15 | ·16 | ·17 | ·18 | · | 19 | | | | · | | | | | · | | | | | · | | | ·33 | · |
| | 17 | ·18 | | | · | | | | | · | | | | | · | | | | | · | | | ·35 | · |
| | 36 | ·47 | ·48 | ·47 | | 48 | ·47 | ·48 | ·47 | | 48 | ·47 | ·48 | ·47 | | 48 | | | | | | | ·54 | |
| | | | | | | | | | | | | | | | | | | | | | | | ·56 | |
| | | | | | | | | | | | | | | | | | | | | | | | ·58 | |
| | | | | | | | | | | | | | | | | | | | | | | | ·60 | |
| | | | | | | | | | | | | | | | | | | | | | | | ·62 | |
| | | | | | | | | | | | | | | | | | | | | | | | ·64 | |
| | | | | | | | | | | | | | | | | | | | | | | | ·66 | |
| | | | | | | | | | | | | | | | | | | | | | | | ·68 | |
| | 48 | | | | | | | | | | | | | | | | | | | | | | ·70 | |

| HEAD #3 | | | HEAD #4 | | | HEAD #4 EXTENDED | | |
|---|---|---|---|---|---|---|---|---|
| 2 | 1 | | 2 | 1 | | 2 | 1 | |
| 12 | 11 | 55 | 12 | 11 | 90 | 12 | 11 | 126 |
| 4 | 3 | 57 | 4 | 3 | 92 | 4 | 3 | 128 |
| 14 | 13 | 59 | 14 | 13 | 94 | 14 | 13 | 130 |
| 6 | 5 | 61 | 6 | 5 | 96 | 6 | 5 | 131 |
| 16 | 15 | 63 | 16 | 15 | 98 | 16 | 15 | ·132 |
| 8 | 7 | 65 | 8 | 7 | 100 | 8 | 7 | |
| 18 | 17 | 67 | 18 | 17 | 102 | 18 | 17 | |
| 10 | 9 | 69 | 10 | 9 | 104 | 10 | 9 | |
| | | 71 | | | 106 | | | |
| | | | | | | | | ·131 |
| | | | | | | | | ·132 |
| | | | | | | | | |
| | | 59 | | | 94 | | | ·131 |
| | | | | | | | | ·132 |
| | | | | | | | | ·131 |
| | | | | | | | | |
| | | | | ·77 | | | | |
| | | | ·78 | | | | | ·132 |
| | | | | | | | | |
| | | 63 | | 77 | 98 | | | |
| | | | ·78 | | | | | |
| | | | | ·77 | | | | |
| | | | ·78 | | | | | |
| | | | | | | | | |
| | | 67 | | ·77 | 102 | | | |
| | | | ·78 | | | | | |
| | | | ·77 | | | | | |
| | | | | ·78 | | | | |

HEAD IMAGE GENERATOR FOR A MATRIX PRINTER

This invention relates to matrix printers and, more particularly, to the head image generator for generating signals to be applied to the printer elements of a slant head wire matrix printer to cause defined characters to be printed.

A wire matrix printer having a plurality of, for instance, eight print heads in which the wires are positioned in a slanted relationship is described in the following patent applications, each of which has a common filing date herewith and a common assignee hereof:

Ser. No. 086,487, invented by G. N. Baker, et al entitled "Microprocessor Controlled Positioning System"

Ser. No. 086,483, invented by A. W. Oaten, entitled "Print Wire Actuator Block Assembly For Printers"

Ser. No. 086,494, invented by G. N. Baker et al entitled "Partial Line Turnaround for Printers"

Ser. No. 086,568, invented by D. K. Rex, entitled "Ribbon Shield for Printer"

Ser. No. 086,492, invented by A. D. Blanco, et al entitled "Print Head Image Generator For Printer Subsystem"

Ser. No. 086,491, invented by B. R. Cavill, et al entitled "Detection of Multiple Emitter Changes in a Printer Subsystem"

Ser. No. 086,484, invented by W. W. Boynton, et al entitled "Printer Subsystem with Microprocessor Control"

Ser. No. 086,490, invented by W. Greene, et al entitled "Automatic Print Inhibit In Margins for Printer Subsystem"

Ser. No. 086,384, invented by L. Zimmerman entitled "Font Selection and Compression For Printer Subsystem"

Ser. No. 086,567, invented by E. T. Brown, et al entitled "Microcomputer Control of Ribbon Drive For Printers"

Ser. No. 086,383, invented by G. Bare, et al entitled "Wire Fire Mapping For Printers".

Each of the above mentioned patent applications is hereby incorporated by reference.

Matrix printers, and particularly wire matrix printers, are adapted to print many different types of character fonts. Of particular interest herein is the ability to print characters commonly used in the Orient, such as traditional Japanese known as Kanji. These characters may be printed in an 18 by 18 dot matrix with an addition of two dots columns between characters, so that each character requires a horizontal distance of 20 dots and a vertical distance of 18 dots. Traditional wire matrix print heads of the type having a single vertical row of wires can easily be controlled to print the 20 by 18 matrix required for Kanji characters by sending data to each of the wires of the print head as the print head moves across the paper. However, in the case of the slant head matrix printer described in the previously mentioned patent applications where each wire is over a different character, it becomes a complex matter to control the data applied to the print heads so that the proper wires are actuated at the proper time to form the characters.

In patent application Ser. No. 086,492, a print head image generator is described in which a pair of text buffers are provided into which a host system stores an address code defining an entire line of characters. Each address code defines an area of memory in which a 9 by 7 matrix image of a particular character to be printed is stored. The head image generator, in response to the address addressed in the next text buffer, reads predesignated columns in the memory and provides signals to desired wire actuators to cause the desired dots to be printed. Each time the head moves, a different column of each wire image stored in the memory is decoded and the desired bits from that column are transmitted to the wire actuators.

As one of the text buffers is being filled with addresses by the host processor, the head image generator is decoding the wire image address contained by the other text buffer. After the one text buffer is filled and the other decoded, the two text buffers are reversed so that the full one is decoded and the previously decoded text buffer is cleared and filled with addresses defining a new line of data to be printed.

In the head image generator of the type described in the preceding paragraph, extensive use is made of decoding circuits to decode the information addressed by the text buffer. In printing the conventional alpha numeric characters in 9 by 7 matrices, where adjacent dots cannot be printed, whereby a maximum of thirty five dots per character exists, the decoding circuits are a good solution to converting the matrix memory store into a slant head wire image. However, when printing Kanji type characters, where dots can be printed in each location of an 18 by 18 matrix, whereby there are 324 dots per character, the amount of circuits required to decode the memories and provide a wire image to the slant head printer becomes extensive. It would be preferable in printing characters of the complexity of Kanji characters to use a combination of hardware and a programmed microprocessor to accomplish at least the portion of the wire image generation related to converting the matrix memory storage into the slant head wire image storage.

In accordance with one aspect of this invention, there is provided a matrix printer for printing matrix characters on a record medium which includes at least one print head which moves across the record medium. The print head includes a plurality of printing elements, each of which is operable to cause a symbol to be printed. Each character has a plurality of printed symbols in an arranged configuration within a character matrix. The printing elements are positioned with respect to one another along at least one path which is nonperpendicular to the print head movement. The printer further includes means for providing data defining the arrangement of the symbols in the character and memory means into which data can be stored and from which previously stored data can be read.

The printer also includes means for storing the symbol defining data in the memory means in an order related to the printing element positioning and means for reading the data stored in the memory means in one of a column or row order and for providing the read data to operate the printing elements.

A description of one preferred embodiment of the subject invention is hereafter described with specific reference being made to the following figures, in which:

FIG. 5 illustrates three Kanji type characters printed by the print head shown in FIG. 4;

Figure 14D:
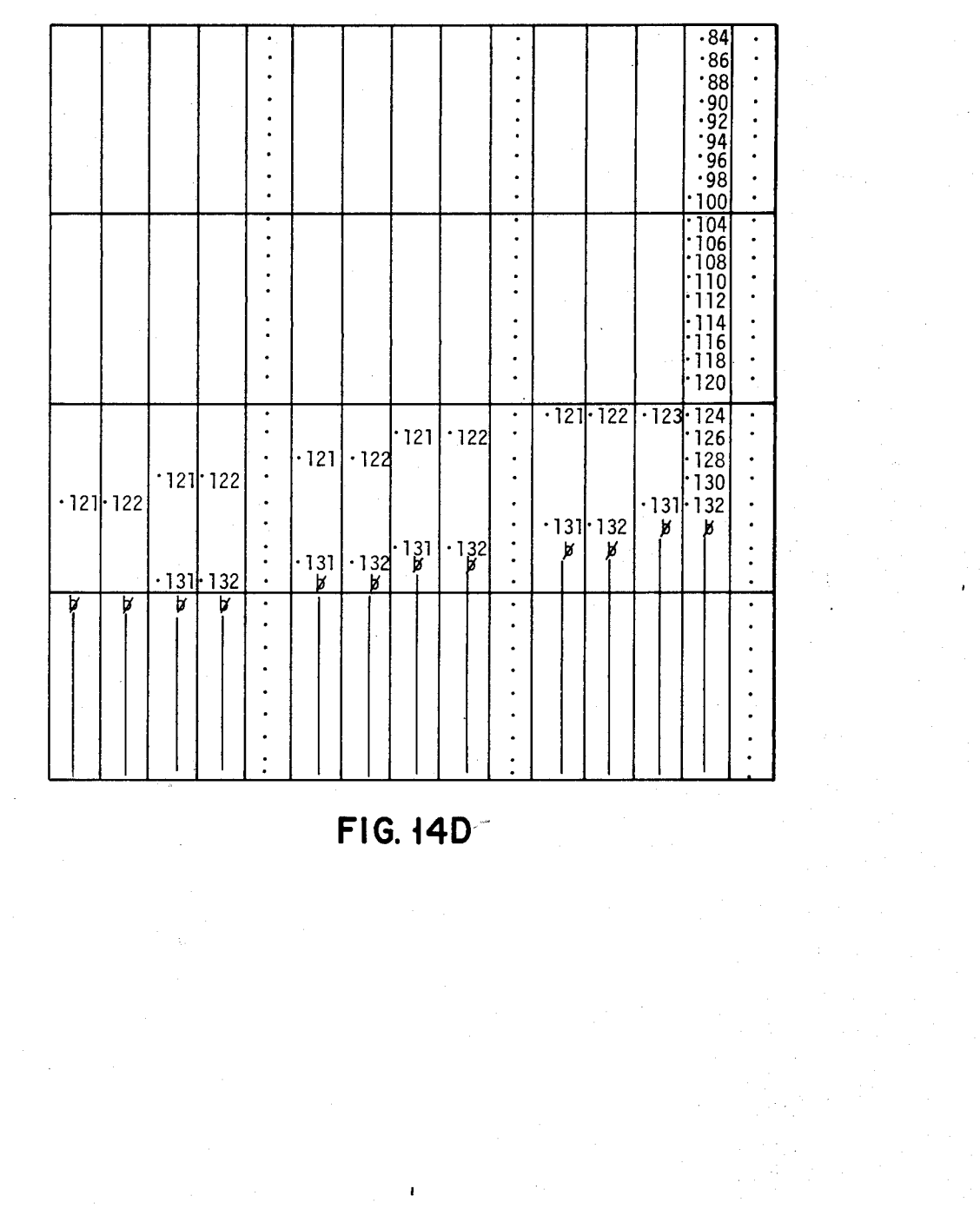
Figure 15A:
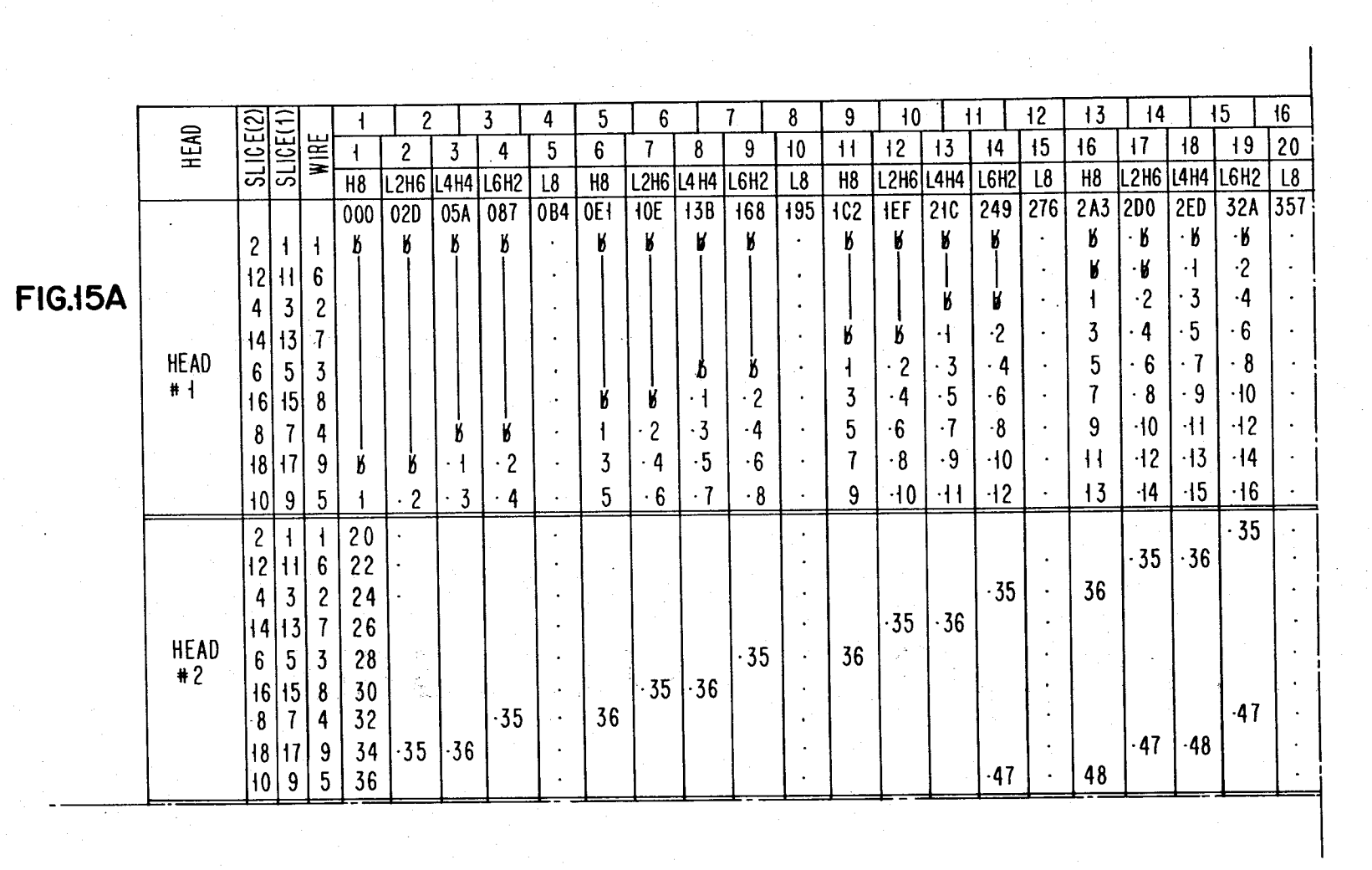
Figure 15D:
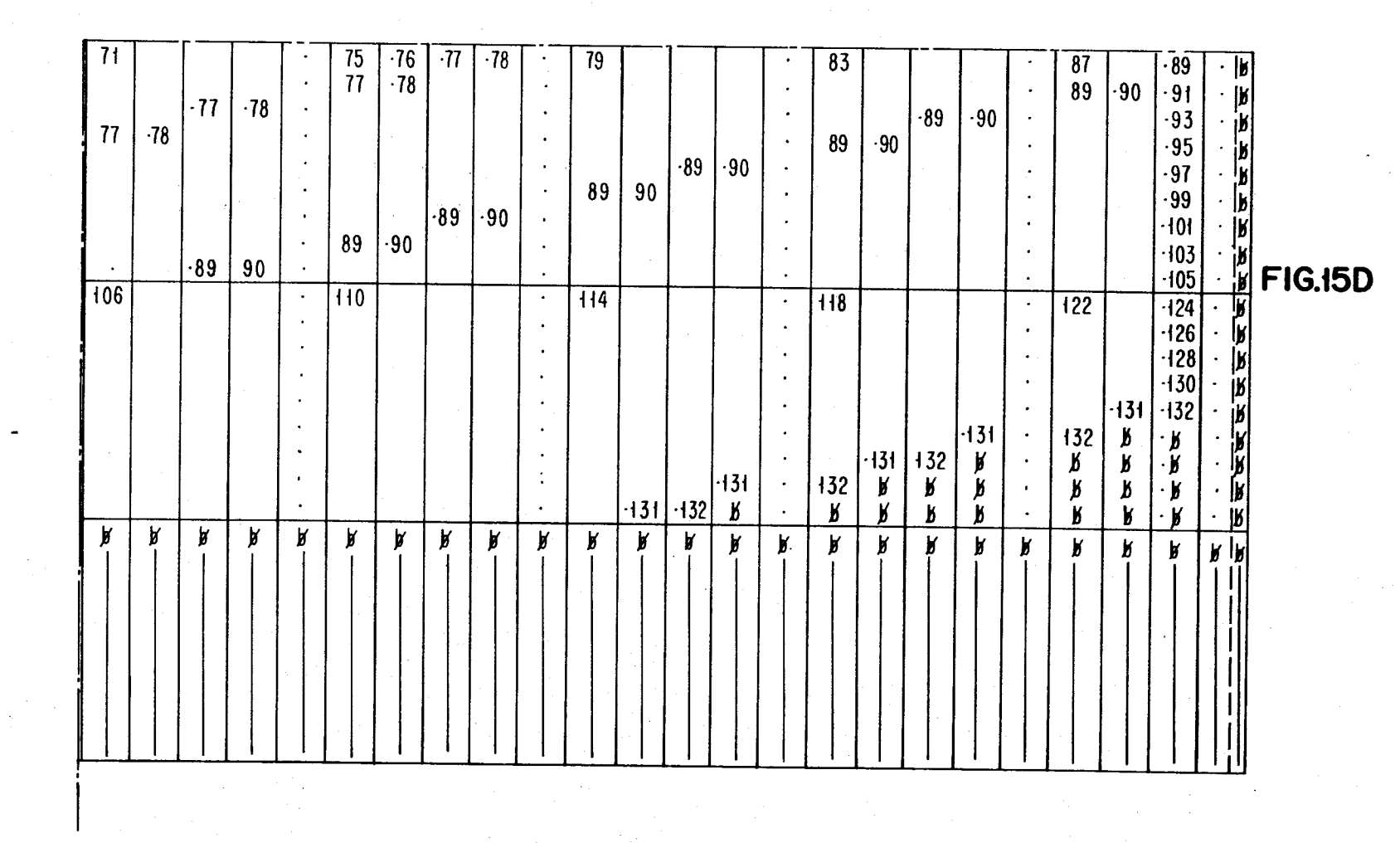

FIGS. 14A through 14D, arranged as shown in FIG. 14, show a map of the wire image storage for a seven head printer; and FIGS. 15A through 15D, arranged as shown in FIG. 15, show a map of the wire image storage for a four head printer.

In order to best illustrate the utility of the subject invention, it is described in conjunction with a high speed wire matrix printer capable of printing in the range of 145 lines of Kanji characters per minute on continuous forms. The particular printer is associated with a host computer system and responds to command and data signals from the host system to print on the forms and, in turn, provides status signals to the host during operations.

The printer itself is an output line printer designed to satisfy a variety of printing requirements in data processing, data collection, data entry and communication systems. It can be used as a system printer or a remote work station printer. The particular printer described herein is capable of printing in either traditional alphanumeric or alphanumeric Katakana (ANK) type characters or in more complex Kanji type characters. The printer is designed so that approximately 3700 different Kanji characters are defined in read only storage memory. Out of the many tens of thousands of different Kanji characters, there additionally is provided read write storage into which codes defining additional Kanji characters used for a particular customer's application or new defined characters, such as logos, can be stored. This type of character is referred to herein as Gaiji characters.

Mechanically the printer is substantially the same as that described in the above cited patent applications. Particularly reference is made to application Ser. No. 086,484 which contains a complete description of the entire printer system. The present invention differs from application Ser. No. 086,484 mechanically in two respects. First, the print block contains seven print heads of nine wires each instead of eight print heads of eight wires each, and, second, the forms feed system is that described in application Ser. No. 086,487, which allows small movements of the forms feed system to allow printing between previously printed dots.

Figure 1:
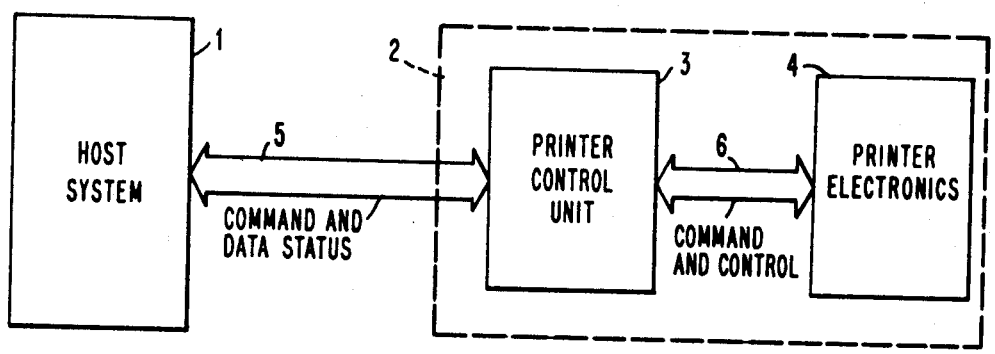
FIG. 1 is a simplified system diagram for the printer system.

Referring now to FIG. 1, there is shown a representative system configuration including a host system 1 and the printer system 2, which includes a printer control unit 3 and printer electronics 4. Command and data signals are provided by the host system to printer control unit 3 by way of bus 5, and command and control signals are provided from printer control unit 3 to the printer electronics 4 by way of bus 6. Status signals are supplied by printer control unit 3 to host system 1 by way of bus 5. Typically, the host system 1 generates information including commands and data and monitors status. Printer control unit 3 receives the commands and data, decodes the commands, checks for errors and generates status information, controls printing and spacing, and contains printer diagnostics. Printer electronics 4 executes decoded control unit commands, monitors all printer operations, actuates print wires, drives motors, senses printer emitters, and controls operator panel lights and switching circuitry. It controls the tractor/platen mechanism, the ribbon drive, the print head carrier, the operator panel, and the printer sensors.

The elements of the system, such as printer control unit 3 and printer electronics 4, incorporate one or more microprocessors or microcomputers to analyze commands and data and to control operations.

Figure 2:
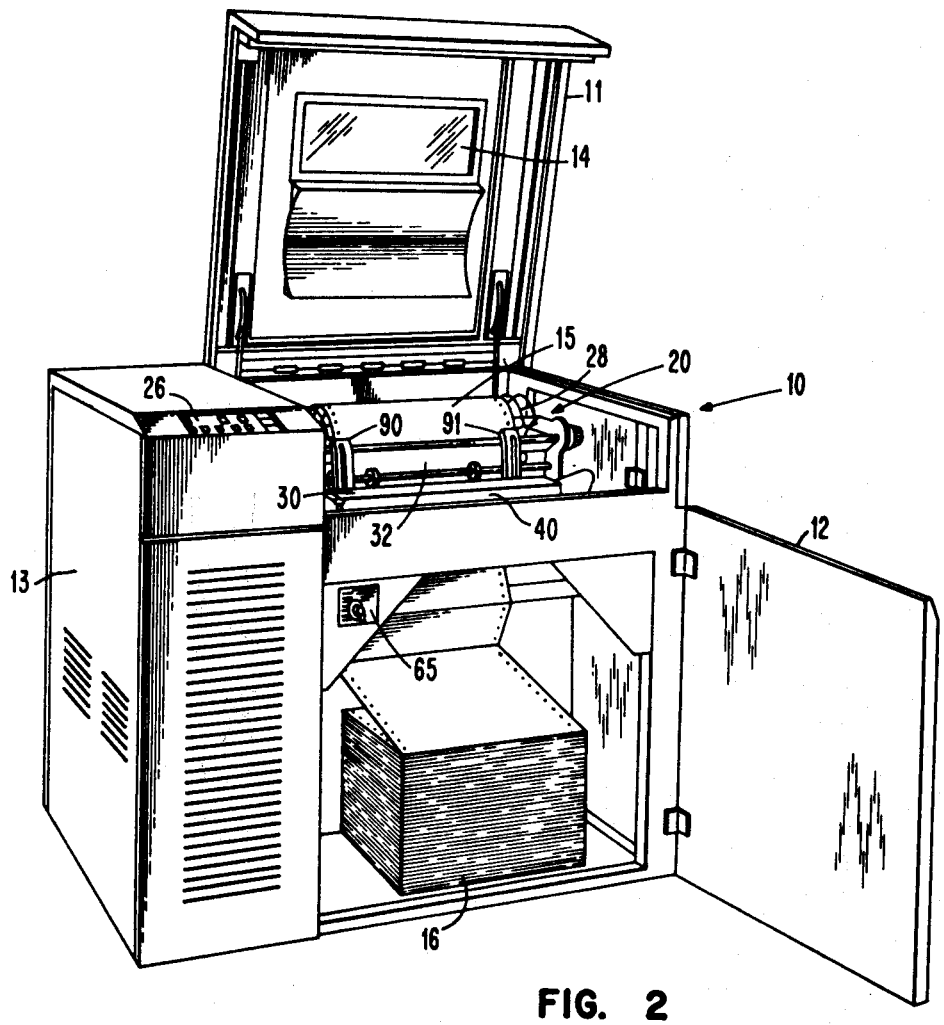
FIG. 2 illustrates the printer console and a number of printer components.
Figure 3:
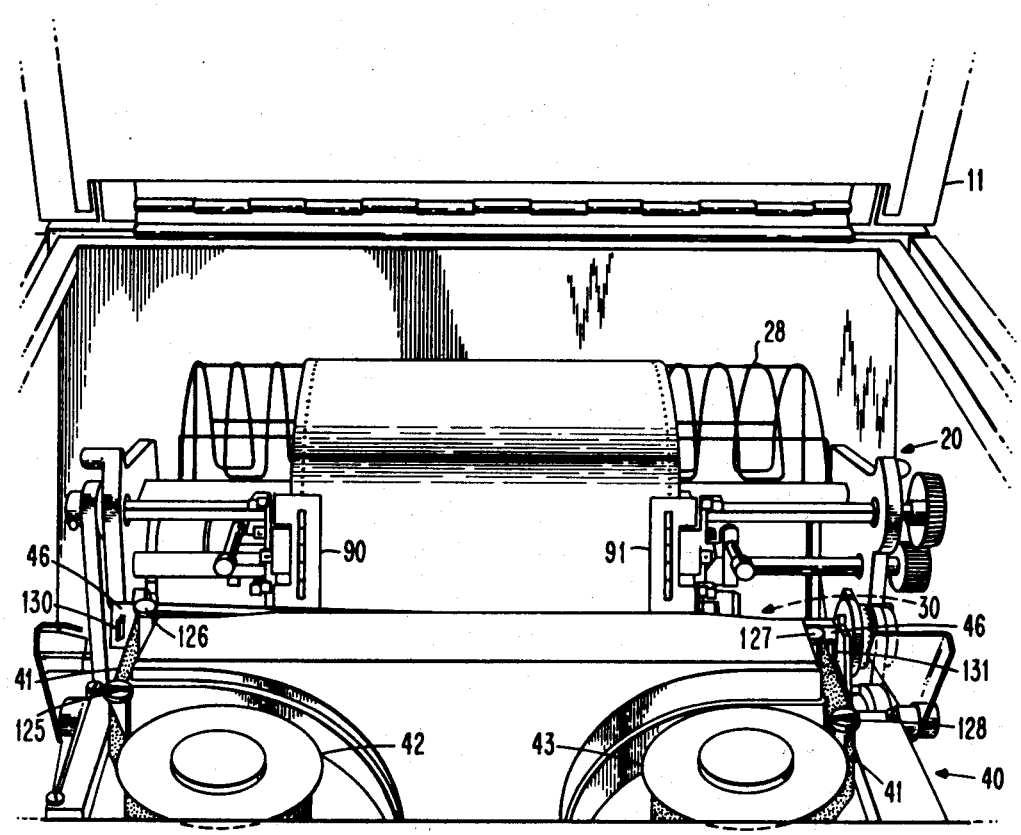
FIG. 3 is a frontal view of the printer unit in the printer console shown in FIG. 2.

FIGS. 2 and 3 illustrate various components of the printer, all of which are housed in the console 10. Various access panels or covers such as those designated 11, 12, and 13 are provided. Top cover 11 has a window 14 that enables an operator to observe forms movement during operation of the printer when the cover is closed. The record medium, or forms, 15 are provided from a stack 16 and can be fed in one embodiment upwardly or downwardly as viewed in FIGS. 2 and 3 by means of a forms feed assembly 20 which includes one or more sets of forms tractors 90 and 91. A forms guide 28 guides the forms after printing to a takeup stack (not shown) positioned below the printing mechanism and to the rear of the printer console. The printer incorporates a print assembly 30 that is positioned generally in a horizontal relationship with respect to forms 15 at a print station 32. The printer ribbon drive assembly 40 is located in closer proximity to the front of the printer. Printer control unit 3 and its associated microprocessors are generally located behind the side cover 13.

A ribbon 41 is provided on one of the spools 42 or 43, which are disposable. Each box of ribbons would preferably contain a disposable ribbon shield 46 that is mounted on spring attachment members 130 and 131 between print assembly 30 and forms 15 to keep ribbon 41 in proper alignment and to minimize ink smudging on forms 15. The ribbon moves on a path in front of the print head around posts 125, 126, 127 and 128. Two motors drive ribbon 41 back and forth between spools 42 and 43. The printer control unit 3 detects ribbon jams and end of ribbon (EOR) conditions. A ribbon jam turns on an error indicator and stops printing. An EOR condition reverses the ribbon drive direction.

The printer includes an operator panel 26 that consists of several operator control keys, two indicator lights, a power on/off switch, an operator panel display, and a density display. A 16-position mode switch 65 is located behind the front door 12.

Figure 4:
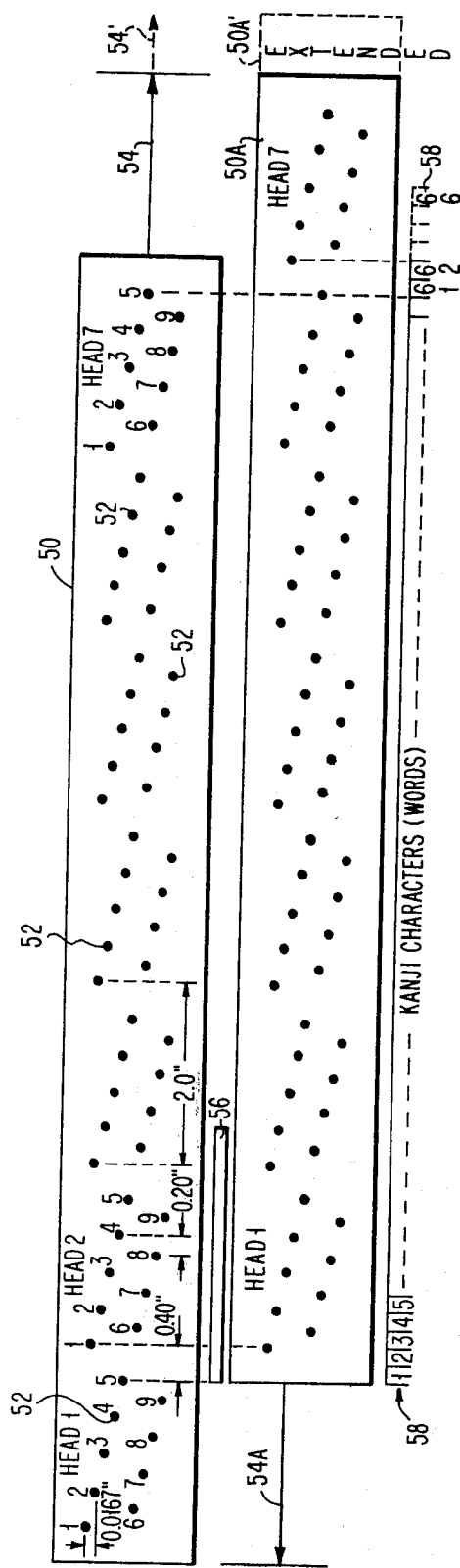
FIG. 4 illustrates a seven head by nine wire per head printing block which moves laterally between the positions shown.

Referring now to FIG. 4, print block 50 includes seven groups of nine print wires 52 and associated actuators (not shown). Print block 50, print wires 52 and the print actuators are described in detail in the referenced patent application Ser. No. 086,484. Each group of nine print wires 52 is referred to as a print head and are respectively designated heads 1 through 7. Each of the print wires 52 are, in turn, respectively numbered 1 through 9 vertically from top to bottom with wires 1 through 5 being on a first slanted path, such that the adjacent wires 52 are separated horizontally by 0.40 inches and vertically by 0.0167 inches. Wires 6 through 9 are positioned on a second slanted path directly below wires 1 through 5 and aligned vertically midway between the respective wires 1 through 5.

Print block 50 is designed to move from the position shown in the upper part of FIG. 4 to the right as indicated by arrow 54. In normal operation, print block 50 moves to a position shown in the lower portion of FIG. 4 and designated by the number 54A. It should be understood that there is only one print block 50 in printer 2 and FIG. 4 show the two extreme positions, vertically aligned, of the one print block 50. Normally print head 50 moves towards the right two inches, which is the distance between print wires 1 of adjacent print heads. This is sufficient to print 124 ANK or 62 Kanji characters. However, when it is desired to print a full 132 ANK or 66 Kanji characters on a line, it is necessary to move print head 50 an additional 0.80 inches, as indicated by arrow 54' to the position shown by 50A'. After print head 50 has moved to the right margin position, shown by print head 50A, the forms 15 is moved a distance equal to one-half the vertical space between adjacent print wires 52, or 0.0083 inches. Thereafter, print head 50, when in the position 50A is moved from the right to the left as indicated by arrow 54A back to the position shown for print head 50.

As print head 50 moves according to arrow 54 or 54A, an emitter detector (not shown) coupled thereto passes over print emitter 56, which provides an electric pulse for each 0.010 inches of movement. The control circuit shown in FIGS. 7 and 8 responds to the print emitter pulses by causing the actuation of desired print actuators to cause the print wires 52 to be fired, thereby causing dot symbols to appear on the forms 15. The characters 58 printed on the forms 15 are shown aligned with the two positions 50 and 50A of print block 50 and consist of 62 Kanji words of 20 dot width each, which can be extended to 66 words if print block 50 moves as indicated by arrow 54', or 124 ANK characters, which can be extended to 132 ANK characters if print block 50 is moved as indicated by arrow 54'.

Referring now to FIG. 5, three Kanji words are shown in detail. Each of the words consist of a dot matrix which is 20 columns wide and 18 rows high. A dot can be printed in any of the 360 positions of each word matrix; however, columns 19 and 20 of each matrix are intentionally left blank to afford spacing between adjacent words. Each word can be further brokwn down into two characters of 10 columns each. The rows of each word matrix are alternately printed in the left to right motion and the right to left motion of print block 50. Thus, the odd numbered rows may be printed on the left to right movement of print block 50 and the even rows may be printed on the right to left movement of print block 50. More specifically, row 1 is printed by wire 1 while print block 50 is moving in the position shown by arrow 54, and row 2 is printed by wire 1 when print block 50 is moving in the direction indicated by arrow 54A. At the right side of FIG. 5, the print wire and an arrow indicating the direction of movement is shown to indicate which row is printed by which print wire and in which direction of movement of print block 50. As used herein, the first pass is intended to indicate the left to right movement of the print block 50 as indicated by arrow 54, and the second pass is intended to indicate the right to left movement of print block 50 as indicated by arrow 54A. When print block 50 is in the leftmost position, shown by the upper portion of FIG. 4, wire 5 of print head 1 is aligned over column 1 of word 1. At the same time, wire 1 of head 2 is aligned over column 1 of word 3, wire 6 of head 2 is aligned over column 1 of word 4. Wire 2 of head 2 is aligned over column 1 of word 5, and so forth, such that wire 5 of head 7 is aligned over column 1 of word 61. As print block 50 begins moving each of heads 1 through 7 towards the right, as indicated by arrow 54, a determination is made whether any of the wires aligned over the various parts of each word should cause a dot to be printed. If so, the actuator associated with that wire 52 is fired. Next as print block 50 moves towards the right, wire 5 of head 1 is aligned with column 2 of word 1. Wire 1 of head 2 is aligned with Column 2 of word 3, and so forth. After the movement of 20 columns of word 1, wire 5 of head 1 will be aligned with Column 1 of word 2 and wire 9 of head 1 will be aligned with column 1 of word 1. Ultimately, when print block 50 has moved to the position shown as 50A, each of the wires 1 through 9 of head 1 will have passed over each of the columns of word 1. As shown in the position 50A of print block 50, wire 1 will then be positioned over the last or 20th column of word 2. It should be noted that the actual movement of print block 50 will be further than this in order to decelerate it, stop it, and accelerate its speed so that at the time print block 50 is moving from the right to left, as indicated by arrow 54A it has reached full speed by the time it is ready to print at the last column of word 2. It should also be noted that in many of the words to be printed, some dots will be printed by one print head and the remaining dots by an adjacent print head. For instance, in word 3, wire 1 of head 2 prints the dots in the first row, whereas wires 2 through 9 of head 1 print the dots in the remaining rows.

Figure 6:
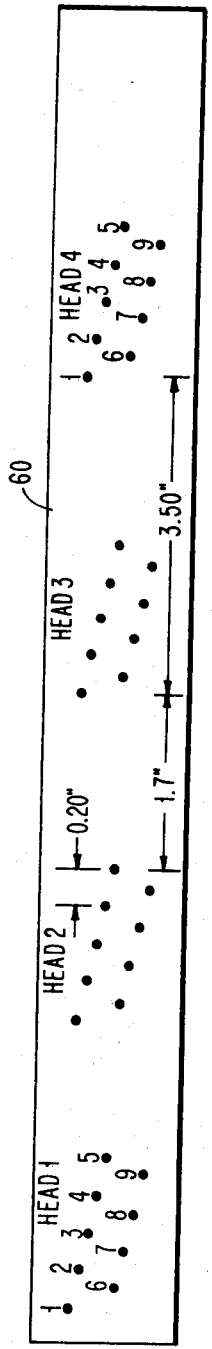
FIG. 6 shows a printing block having four nine wire heads.

Referring now to FIG. 6, print block 60 is shown which is similar to print block 50 except that only four heads of nine wires each are shown. In this case, the distance between wire 1 of adjacent heads is 3.5 inches rather than 2.0 inches as was the case with print block 50. Also, print block 60 must move further from side to side in view of the greater distance separating adjacent print heads.

Figure 7:
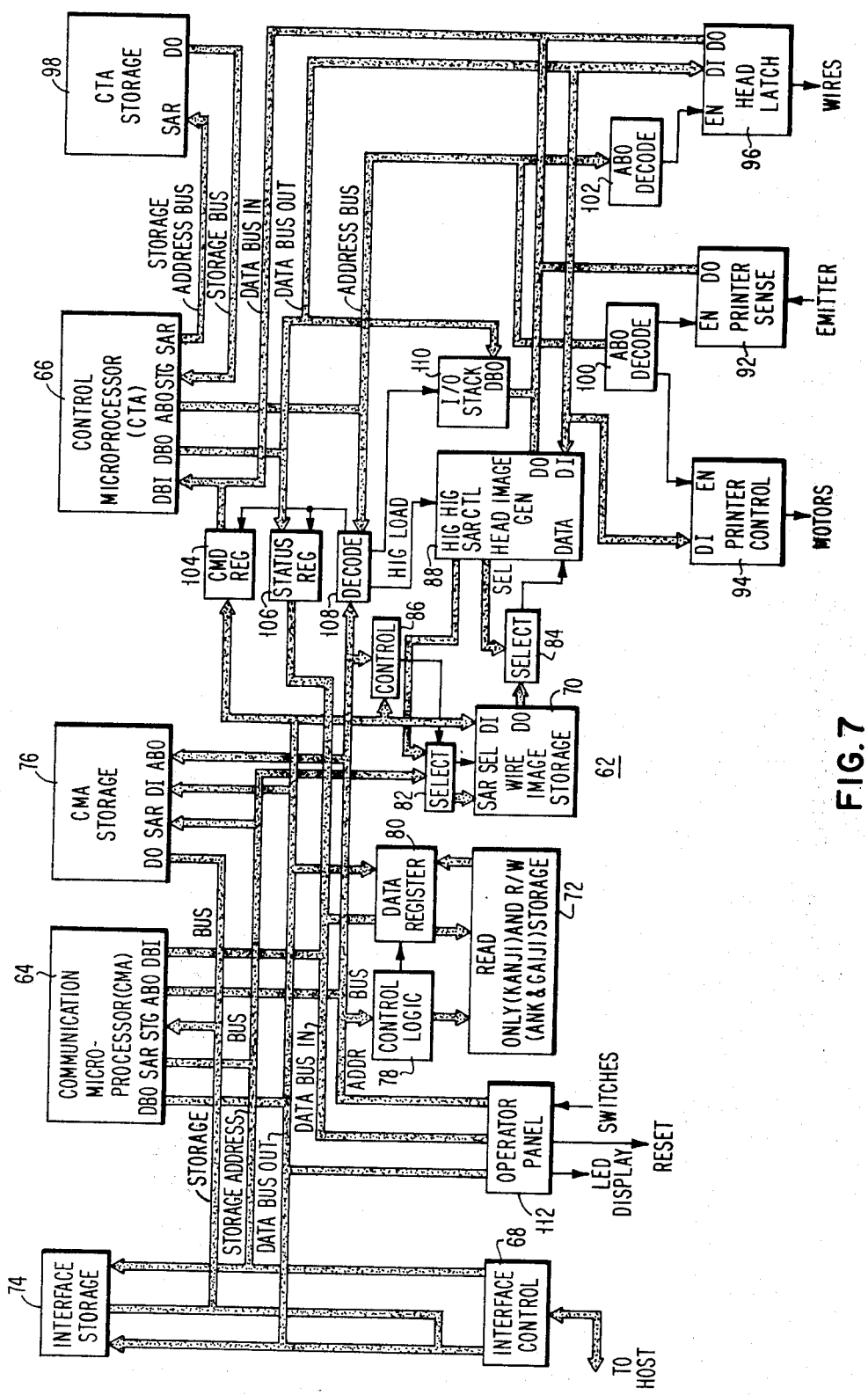
FIG. 7 shows a block diagram of the printer control unit.

Referring now to FIG. 7, control circuit 62, is shown. The heart of control circuit 62 is communications microprocessor (CMA) 64 and control microprocessor (CTA) 66. Communications microprocessor 64 and control microprocessor 66, may be microprocessors of the type described in U.S. patent application Ser. No. 866,425 filed in the name of J. D. Dixon on Jan. 3, 1978, and entitled "An Instruction For Simultaneous Returning and Linking Between Two Subroutines". The purpose of communications microprocessor 64 is to take data from host system 1, applied through interface control 68, and convert that data into an acceptable wire image which is stored in wire image storage 70. The data applied from host system 1 includes status, control and character definition information. Only the character definition information will be discussed herein. The status and control information has been discussed in the previously cited patent applications and paticularly in application Ser. No. 086,490. The character definition information, or data, applied from host system 1 through control interface 68 is in the form of address codes which define a particular Kanji character stored in storage 72. Storage 72 consists of both read only and read/write storage units. Approximately 3700 different images for Kanji characters are stored in the read only portion of storage 72 and these are organized in blocks define by a 16 bit address code. The host processor 1 applies a 16 bit code through interface control 68 to microprocessor 64.

Microprocessor 64 then addresses storage 72 with this code to read the appropriate Kanji character defined by the 16 bits.

The read/write portion of storage 72 contains both alphanumeric Katakana (ANK) and Gaiji characters. The ANK characters are similar to those described in the cited patent applications such as Ser. No. 086,484. These characters are nine columns wide be seven columns high and are printed by a single pass of print block 50 moving in one of the directions shown by arrows 54 or 54A. In printing ANK characters, wire 1 is not used and wire 9 is used for underlines. The Gaiji characters are customized characters similar to the Kanji characters but not included in the approximately 3700 stored in the read only portion of storage 72. The wire image code stored in storage 72 for both the ANK and Gaiji characters is applied thereto from host system 1 under the control of microprocessor 64 in the manner described in the cited patent application Ser. No. 086,484. Since the ANK type characters require only one-half the number of columns, they can be addressed by an eight bit address signal applied from host system 1. The Gaiji characters, on the other hand, being of the same size as the Kanji characters, shown in FIG. 5, require a 16 bit address signal.

Data is provided from host system 1 through interface control 68 and stored in interface storage 74. Communications microprocessor 64 looks at the information in interface storage 74, which may include status commands, control commands, such as moving a forms, or the like, or character definition information. The character definition information is taken from interface storage 74 by communications microprocessor 64 and stored in CMA storage 76. CMA storage 76 includes both read only storage and read/write storage. The read only storage may be, for instance, the set of instructions for controlling control microprocessor 64 and the read/write storage may include scratch pad memory as well as a text buffer and attribute buffer.

The text buffer portion of CMA storage 76 is a block of memory for storing the address codes for the characters to be printed. The text buffer is divided into 132 bytes and can be used to define up to 132 ANK characters or 66 Kanji or Gaiji characters. In addition, CMA storage 76 includes a second block of memory called the attribute buffer. The attribute buffer has 132 bit positions. A "1" is placed in every position in which either a Kanji or a Gaiji character is to be printed and a "0" bit is placed in the bit position for an ANK character.

Communications microprocessor 64 responds to information provided to the STG input thereof from CMA storage 76 over the storage bus STG. In addition, microprocessor 64 responds to information from the data bus in (DBI). Microprocessor 64 provides data information on the data bus out (DBO) and address information for I/O devices on the address bus out (ABO) and address information for storage devices on the storage address bus (SAR). CMA storage 76 responds to signals on the storage address, data out and address buses provided to the SAR, DI and ABO inputs respectively thereof, and provides instruction signals on the DO output thereof to the storage bus. The address information on the ABO bus applied to storage 76 may be used to control the paging of the memory included in storage 76 and the information on the SAR bus defines a specific location in the particular paged memory section. The data provided to the data in (DI) input of storage 76 from the data bus out is used to write information into scratch pad memory. The data out (DO) output from storage 76 is used to carry the information red from the memory in storage 76.

Read only and read/write storage 72 has associated, therewith control logic 78 and data register 80. Control logic 78 responds to signals on the address bus provided from communications microprocessor 64, and provides appropriate signals to address the desired portion of storage 72. In addition, control logic 78 provides a signal to latch data into data register 80 transmitted from storage 72. Data register 80 responds to data provided from microprocessor 64 over the data bus out and transmits the data stored in data registers 80 to microprocessor 64 over the data bus in. In addition, data can be transferred to and from storage 72 from and to data registers 80.

Wire image storage 70 is a 4K byte by 8 bit memory which, under the control of select logic 82, select logic 84 and control logic 86 acts as dual 2K byte by 8 bit read/write storage units. Select logic 82 is responsive to address signals applied over the storage address bus from communications microprocessor 64 and address signals applied over the storage address bus from head image generator 88. In addition, select logic 82 is responsive to a control signal from control logic 86 which determines which of the two sets of address signals applied to select logic 82 is to be applied to address which of the two portion of wire image storage 70. With the duality of wire image storage 70, it becomes possible to write information to one part of storage 70 corresponding to the wire image of the next line to be printed, while reading information from the other portion through head image generator 88 to control the firing of the wire actuators for the line then being printed. The details of how this occurs will be explained in more detail with respect to FIG. 8.

The data out (DO) output from wire image storage 70 is provided to select circuit 84 which also responds to signals over a select bus from head image generator 88 and provides data to head image generator 88. Control logic 86 responds to the data signals on the data bus out and to the address signals on the address bus, provided from communications microprocessor 64.

Control microprocessor 66 (CTA) receives inputs from various sensors in printer sense circuit 92, such as the emitter, ribbon reverse jam, forms jam, head position, linear encoder, forms position encoder, as well as print command and data from microprocessor 64 and head image generator 88. Control microprocessor 66 generates the printer control signals which are applied over its data out bus to the data in (DI) input of printer control logic 94 to control the various motors and drives in the system, such as the ribbon drive, the print head drive, and the forms drive. In addition, control microprocessor 66 controls head image generator 88 to cause the appropriate data to be applied to the actuators to control the wires.

Control microprocessor 66 provides data signals oer the data bus out (DBO) and provides address signals over the address bus (ABO) and the storage address bus (SAR). In addition, control microprocessor 66 receives instruction signals from CTA storage 98 over the storage (STG) bus and data over the data bus (DBI).

Printer sense circuit 92 and printer control logic 94 have associated therewith decode logic 100 which, in response to signals applied thereto over the address bus, selects whether printer control logic 94 is to respond to the data applied over the data bus out to the DI input thereof, or selects printer sense 92 to provide data from its data out (DO) output over the data bus in to microprocessor 66. Decode logic 100 selects the one of printer control logic 94 or printer sense circuit 92 by decoding the address signal applied thereto and providing an appropriate signal to the enable input of one of printer control logic 92 or printer sense circuit 94.

Head latch circuit 96 also has associated therewith decode logic 102 which circuit decodes the address signals on the address bus and provides a signal to the enable input of head latch circuit 96 to enable it to either receive data at its DI input from the microprocessor 66 data bus out or to provide data from its DO output to microprocessor 66 over the data bus in.

Communications microprocessor 64 and control microprocessor 66 can interchange information through command register 104 and status register 106. Decode logic 108 controls command register 104 and status register 106 to provide the synchronizm in the data flow from communications microprocessor 64 to control microprocessor 66 which normally operate asynchronous to one another. I/O stack 110 may also be used as a local storage to store intermediate data during data transfer from communications microprocessors 64 to control microprocessor 66. Command register 104 receives data from the data bus out from microprocessor 64 and provides data to the data bus in of microprocessor 66. On the other hand, status register 106 receives data from the data bus out of microprocessor 66 and provides to the data bus in of microprocessor 64. Decode circuit 108 is responsive to the address bus from both microprocessor 64 and 66 and provides control signals to status register 106 and command register 104. In addition decode 108 provides control signals to image generator 88 and I/O stack 110.

The last block of electronic control circuit 62 is the operator panel 112 which responds to signals from the data bus out and the address bus of communications microprocessor 64 and provides signals to the data bus in of communications microprocessor 64. The operator panel 112 communicates with LED display lights, reset circuits and switches, all on the operator panel 26 shown in FIG. 2.

Figure 8:
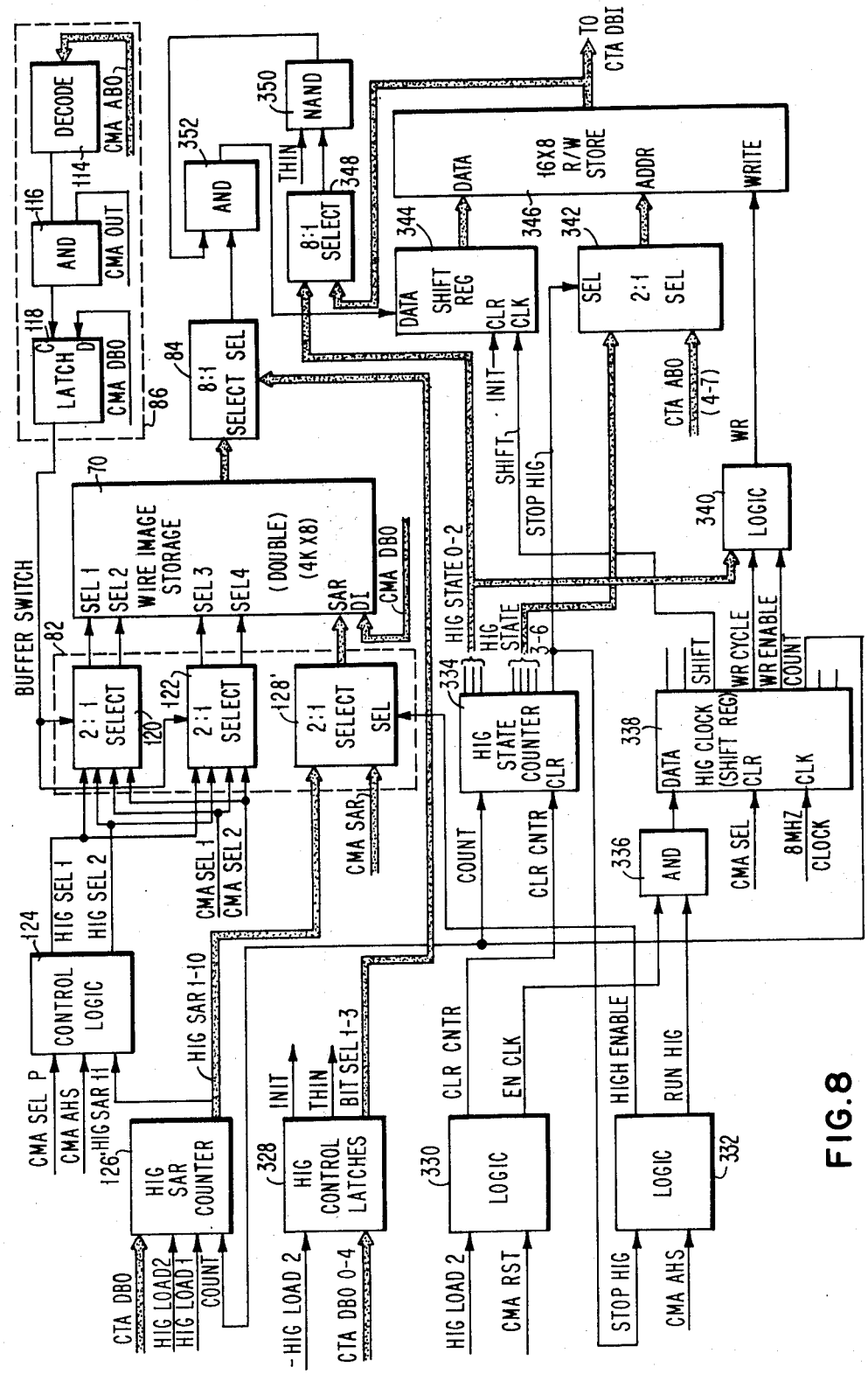
FIG. 8 illustrates a more detailed block diagram of the wire image storage and head image generator block shown in FIG. 7.
Figure 9:
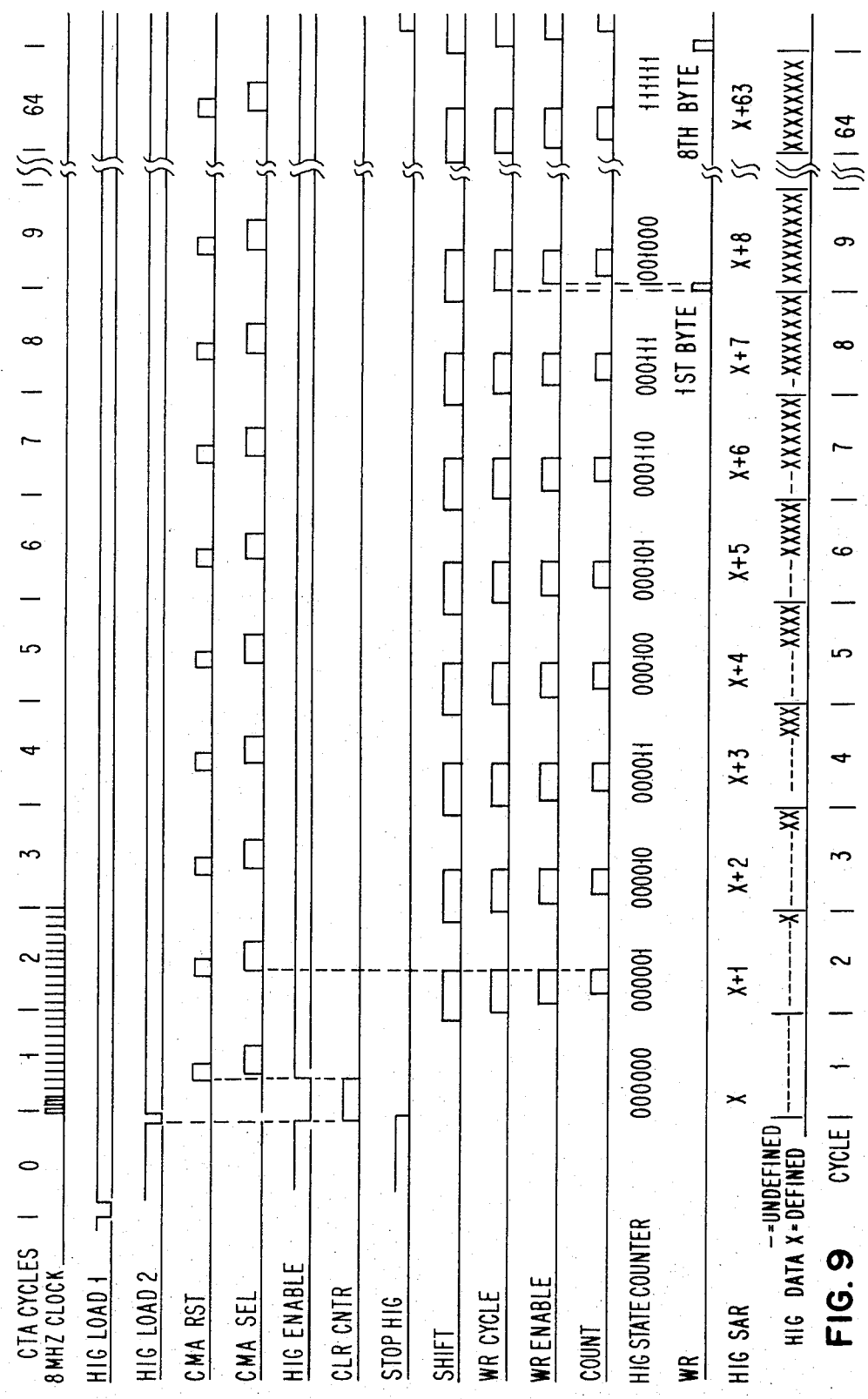
FIG. 9 illustrates certain signals useful in the understanding of FIG. 8.

Referring now to FIG. 8, a more detailed diagram of wire image storage 70, select circuits 82 and 84, control circuit 86 and head image generator 88 is shown. FIG. 9 shows a series of waveforms useful in understanding the operation of FIG. 8. The description of FIG. 8 will be undertaken herein with the assistance of FIGS. 10 through 13, which show a flow diagram of a portion of the program for controlling communications microprocessor 64 to load the wire image into wire image storage 70. The organization of wire image storage 70 is shown in FIGS. 14A through 14D when connected as shown in FIG. 14 for the seven head print block 50 and in FIGS. 15A through 15D when connected as shown in FIG. 15 for the four head print block 60. The remaining portion of FIG. 8 will be described hereafter with respect to the reading of wire image storage 70 by head image generator 88.

Prior to writing information into wire image storage 70, it is necessary to select which portion is to be written into and which portion is to be read from. Control circuit 86 and select circuit 82 perform this function. Control circuit 86 consists of decode logic 114 responsive to the address bus from communications microprocessor 64. For a certain address defining an I/O device such as control circuit 86, decode logic 114 decodes the address signal from communications microprocessor 64 and provides a signal enabling AND gate 116. Whenever communications microprocessor 64 executes an output instruction, the CMA out signal is provided, causing AND gate 116 to clock the data on one line of communications microprocessor 64 into latch 118. The one data bus out line is coupled to the data input of latch 118 thereby setting latch 118 if a logic "1" signal is applied, to cause the buffer switch signal to become high. The buffer switch signal from latch 118 is provided to the control inputs of the 2:1 select circuits 120 and 122 which are a part of select circuit 82. Select circuits 120 and 122 are such that the buffer switch signal gates one of the two sets of inputs to the outputs. Thus, the two outputs of the select circuits 120 and 122 are reversed whenever the polarity of the buffer switch signal from latch 118 changes. The control of the select circuits 120 and 122 is also influenced by control logic 124 which responds to the select powered (SEL p) and address high select (AHS) signals from communications microprocessor 64 and a signal called HIG SAR 11 applied from HIG SAR counter 126, which will be described hereafter. Control logic 124 provides the HIG SEL 1 and HIG SEL 2 signals to select circuits 120 and 122. Similarly the CMA SEL 1 and CMA SEL 2 signals are applied to select circuits 120 and 122 from communications microprocessors 64. These latter two signals are provided each cycle time of microprocessor 64 as is the CMA SEL powered signal.

The outputs from select circuits 120 and 122 are provided to the four select inputs of wire image storage 70 to select two of the four banks of 1K by 8 bit read/write storage elements. The address signals from the selected banks of storage are provided by 2:1 select circuit 128' in response to a storage address signal provided thereto from communications microprocessor 64 (CMA SAR) or from HIG SAR counter 126'. When writing into wire image storage 70, the CMR SAR signal is provided to address a particular byte of memory into which data provided from the communications microprocessor 64 over the data bus out is written. When reading from wire image storage 70, the HIG SAR signal is provided to address the byte from which data is need.

Referring now to FIGS. 10 through 13 and FIGS. 14A through 14D, arranged as shown in FIG. 14, the manner in which a selected 2K bytes of wire image storage 70 are filled will now be described. The organization of the 2K bytes selected of wire image storage 70 is 25 columns of 72 bytes. Each byte is addressed by a hexadecimal number from "000" to "708". In view of the slant head configuration of each print head, it has been determined to place the data into the selected 2K bytes of wire image storage 70 in a slanted fashion and then to read out the information by head image generator 88 one bit column at a time. With this arrangement, considerable savings in hardware results from the previous techniques, such as shown in the cited patent application Ser. No. 086,484.

Referring now to FIGS. 10 to 13, the program flow diagram for communications microprocessor 64 is shown for that portion of the program which loads the wire image into wire image storage 70. The complete source code program can be found in the file wrappers of the application.

Figure 10:
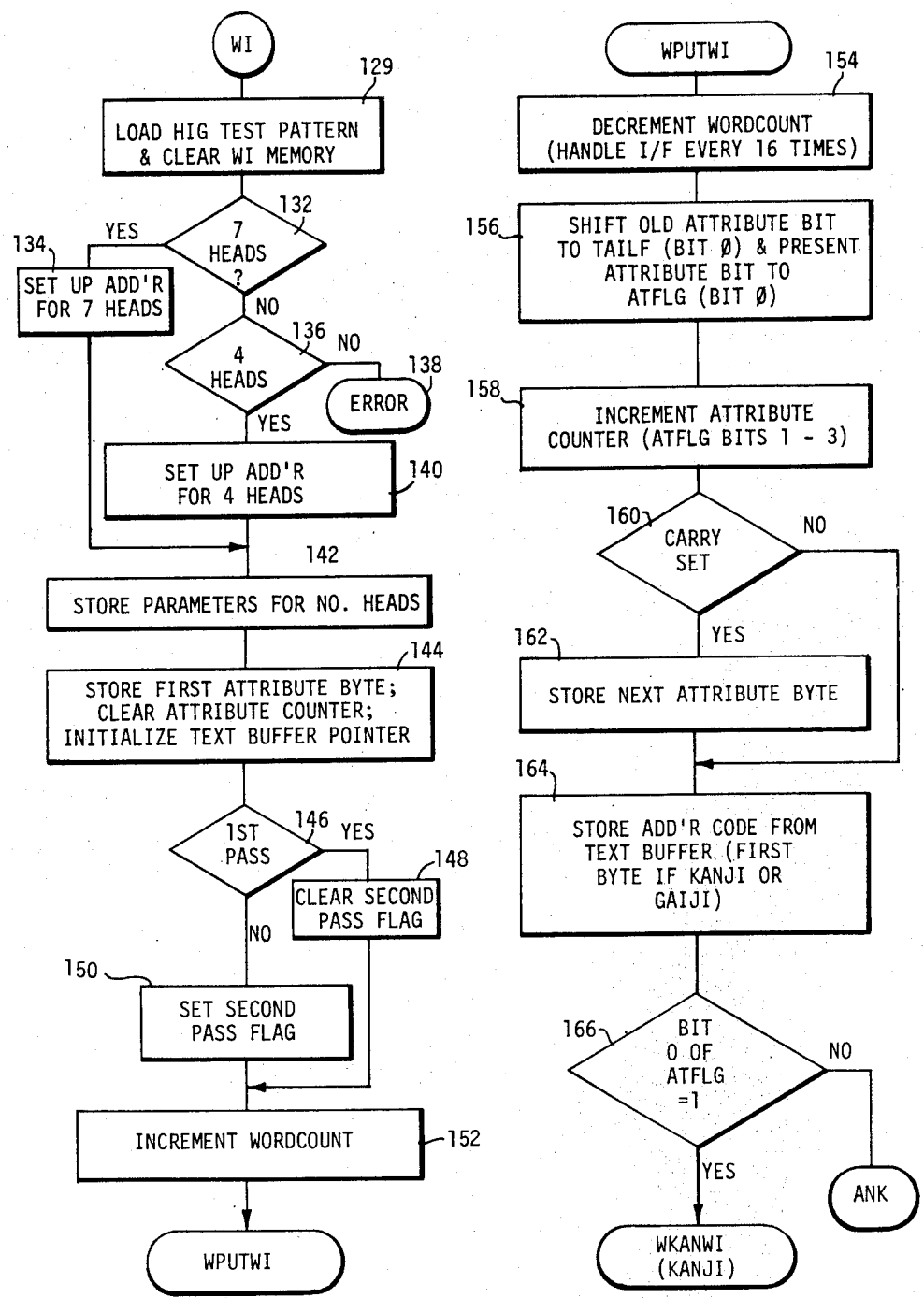
FIGS. 10 through 13 show a flow diagram for the control microprocessor shown in FIG. 7 for causing a desired wire image to be stored in the wire image storage.

In FIG. 10, communications microprocessor 64 begins executing the wire image, or WI, routine to load the appropriate wire image in wire image storage 70 at block 129 where the selected wire image storage 70 is cleared and a test pattern is loaded into the portion of wire image storage 70 above address hexidecimal "708". The test pattern is used to check the operation. Next is indicated by block 132, a determination is made whether printer block 50 contains seven heads. If so, block 134 indicates that the address for the parameters of the seven head machine are set up. If at block 132, it was determined that the machine is not a seven head machine, then block 136 indicates a determination is made whether the machine is a four head machine. If not, an error condition exists as indicated at 138. If a four head machine is determined, then the address for the parameters for the four head machine are set up, as indicated at block 140. Blocks 134 and 140 merge at block 142, which indicates that selected parameters for the particular number of heads are stored in registers internal to communications microprocessor 64 and in the scrach pad portion of CMA storage 76. The parameters include constants related to the length of each column, a pointer to the attribute buffer, a pointer to the text buffer, and various other correction factors and flags which will become apparent as the description of the flow diagram continues.

Communications microprocessor 64 is of a type having a data address register (DAR) and an auxiliary data address register (ADAR) into which a 12 bit address defining a specific byte of memory in either CMA storage 76 or wire image storage 70 can be stored. Using the DAR, instructions for communications microprocessor 64 can cause data to be stored in or read from memory 76 addressed by the DAR. Next, according to block 144, the first byte of the attribute buffer is stored in an internal register of microprocessor 64 and the attribute counter which consists of another internal register of microprocessor 64 is cleared. In addition, the text buffer pointer is initialized. The first attribute byte can be stored by placing the address of the attribute buffer in the DAR and executing a load instruction to the registers into which the attribute byte is to be stored.

Next, according to block 146, a determination is made whether print block 50 is making a first pass or not. A first pass is the left to right movement of print block 50 as indicated by arrow 54 and is indicated by the control data sent from host system 1. If a first pass is occurring, then block 148 indicates that the second pass flag is cleared. If it is not a first pass, then block 150 indicates that the second pass flag is set. In either case, block 152 indicates that the work count counter is incremented by one and thereafter a continuation with the WPUTWI portion of the program occurs, which is shown in the right hand column of FIG. 10.

Continuing with the WPUTWI portion of the program, block 154 indicates that the word count counter is decremented. Each sixteen times that the word count is decremented, a branch occurs to handle the interface routine to determine whether host processor 1 is providing signals to or requesting signals from interface control 68. Next, block 156 indicates that the old attribute is shifted into the least significant bit position (bit 0) of the TAILF internal register and the present attribute bit found in the stored attribute byte is transferred to the bit 0 position of register ATFLG. The old attribute bit was previously in the bit 0 position of register ATFLG. Next, according to block 158, the attribute counter is incremented. The attribute counter is bit positions 1, 2 and 3 of the ATFLG register. It should be noted that each of the internal registers of microprocessor 64 is a four bit register and after the three most significant bits of the ATFLG register have been incremented eight times, the carry indicator is set, thereby indicating that all of the attribute bits contained in the byte stored from the attribute counter have been processed. Thus, block 160 indicates that a determination is made whether the carry is set. If it is, the next attribute byte from the attribute buffer is stored. If not, block 162 is skipped.

Continuing with block 164, one address byte is stored from the text buffer location defined by text buffer pointer and the text buffer pointer is incremented. It should be recalled that the organization of the text buffer is such that for Kanji characters, two address bytes or sixteen bits define the particular Kanji character address, whereas for ANK characters, only one byte is needed to define the address of the ANK character. At block 166 a determination is made whether the 0 bit position of the ATFLG register equals one. This bit, if binary "1" indicates, that a Kanji character is the next character being defined. If so, a Kanji character is indicated in a branch to the WKANWI routine shown in FIG. 11, left column, occurs. If the 0 bit position of ATFLG register was not equal to "1" that is, equal to "0", then a branch to the ANK routine, which is not shown herein, occurs. In the ANK routine, wire image storage 70 is stored with the wire image for the desired ANK routine.

Figure 11:
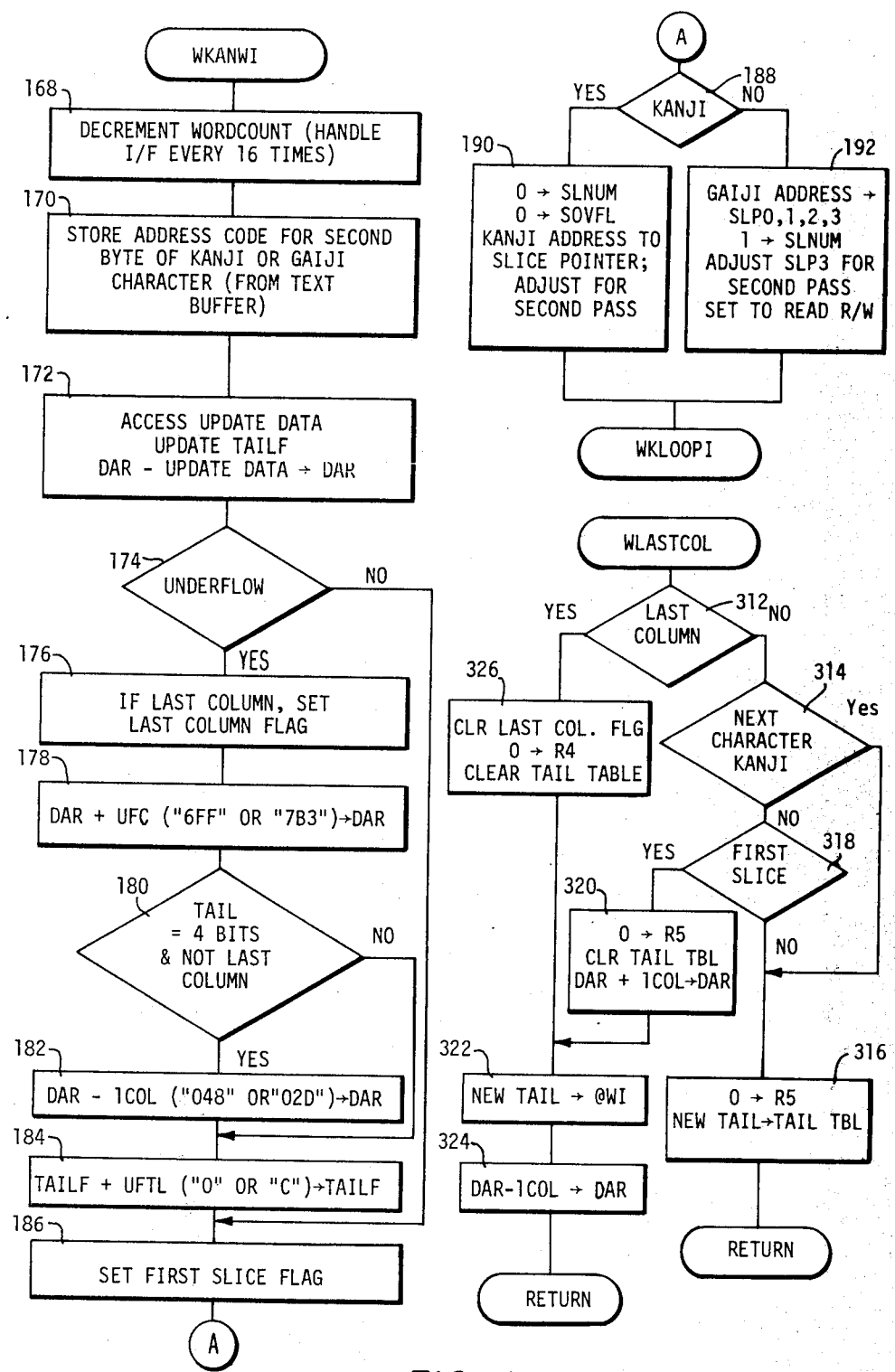

Referring now to FIG. 11, the WKANWI routine is executed if the determination made at block 166 in FIG. 10 indicated that a Kanji character is to be stored in wire image storage 70. First, as indicated by block 168, the word count is decremented and each 16 times this occurs, a branch to handle the interface occurs. Next, according to block 170, the second byte of the address code of the Kanji or the Gaiji word, if that be the case, found in the text buffer is stored in the internal registers of microprocessor 64. Next, according to block 172, the update data found in CMA storage 76 at the address stored as a result of blocks 134 or 140 is accessed and the TAILF register is updated with this data. In the case of the seven head machine, shown in FIG. 4, the hexidecimal character "C" or binary "1100", is stored in the TAILF register. The two most significant bits of the TAILF register are a tail counter which will be explained in more detail later. Bit position 0 of the TAILF register is the old attribute bit, and bit position 1 of the TAILF register is used as the last column flag. Next, in block 172, the DAR which had been initialized with the hexidecimal number "677" has update data subtracted therefrom to cause it to contain the number "5E8".

Referring now to FIGS. 14A through 14D, the organization of wire storage 70 will now be explained. As previously mentioned, the wire image is stored to resemble a matrix of 25 columns by 72 rows, with each column containing 1 byte per row. The row labeled bytes indicates each of the 25 columns. Since each Kanji or Gaiji word consists of 20 columns of dots and each byte consists of 8 bits, the 25 bytes or columns define 20 words, which are indicated by the uppermost row shown in FIGS. 14A and 14B. As used in FIGS. 14A through 14D, each word of Kanji or Gaiji is broken up into 2 characters of 10 bits each.

If ANK characters of 10 columns were being stored in wire image storage 70, then each character would represent one ANK character and would be processed in a similar manner as described herein with respect to FIGS. 10 through 13. Thus, the numbers written into the matrix shown in FIGS. 14A through 14D represent characters rather than words. In other words, characters 1 and 2 define word 1, characters 3 and 4 define word 2, characters 5 and 6 define word 3, and so forth, until characters 131 and 132 define word 66. Since each of the characters are 10 wire columns in width, it requires more than one byte position to define a character. Thus, the heading under the row labeled Bytes indicates the bytes defined in that particular column with respect to a character. For instance, in the first column, the high 8 bits of a particular character are defined. In the second column, the low 2 bits of that character are defined and the high 6 bits of the next character are defined. In column 3, the low 4 bits of the second character and the hgh 4 bits of the third character are defined and in column 4, the low 6 bits of the third character and the high 2 bits of the fourth character are defined. Finally, in column 5, the low 8 bits of the fourth character are defined. Thus, it takes 5 bytes to define the four characters or two words.

Referring to the leftmost portion of FIGS. 14A and 14C, every row of the matrix defines a wire and thus, each nine rows define a different head. Thus, heads 1 through 7 are defined by the first 63 rows. In a situation where it is necessary to print a full 132 character or 66 word line, such that print block 50 must be moved into the extended region defined by 50a', the 64th through 72nd rows defined head 7 operation in the extended region. The column defined as wires indicates which wire the particular row of that head refers to. Thus, the first row refers to wire 1, the second row to wire 6, the third row to wire 7, and so forth. It is noted that these wires are in the order in which they occur from left to right. The two columns labeled slice (1) and slice (2) contain the slice number from storage 72 which contains the definition of the Kanji or Gaiji characters. The characters are defined by a slice beginning with the first row shown in FIG. 5 as slice 1, the second row as slice 2, the third row as slice 3, and so forth, until the last row is slice 18. Each slice contains eighteen bits, which can conveniently be stored in a memory having two bytes plus two parity bits. The memory organization will define the slice for the entire Gaiji or Kanji word of 18 bits at a single address. It is noted that each Kanji or Gaiji character requires a maximum of 18 columns of information to be printed with at least two columns separating each word. While it is unnecessary for storage 72 to contain information with respect to the last two columns of separation, it is necessary that this information be placed in wire image storage 70.

Referring again to FIG. 11, at block 172, the update data, when subtracted from the initial data stored in the DAR, leaves a number of "5E8" contained in the DAR. From FIG. 14B, it is seen at location 5E8, the low two bits of character 1 and the high six bits of character 2 are to be stored. Thus, the DAR is used as a pointer to the particular address in the wire image storage 70 into which information is to be stored. It should be noted that the remaining four low bits of character 2 are referred to as a "tail" and are temporarily stored in a tail table. When characters 3 and 4 are stored in wire image storage 70, those four bits are stored in location "630".

According to block 174, a determination is made whether the DAR reached "0" when the update data was subtracted therefrom. If it did, this indicates that it was pointing to a place to the left of column 1 and must be corrected to point to a different position. Block 176 indicates that the last column flag is then set and block 178 indicates that constant UFC is then added to the DAR. In the case of FIGS. 14A through 14D, the UFC constant is "6FF" and, in the case of FIGS. 15A through 15D, the UFC constant is "7B3".

Next, according to block 180, a determination is made whether the tail is equal to 4 bits and the last column flag is not set. If that determination is yet, then the ICOL constant is subtracted from the DAR. In the case of FIGS. 14A through 14D, this constant is "048", or in the case of FIGS. 15A through 15D, this constant is "02D". This constant is equal to the number of rows contained in the memory map shown in FIGS. 14A through 14D, or FIGS. 15A through 15D. If the determination at block 180, was negative, block 182 is skipped and then, according to block 184, the TAILF register is incremented by the constant UFTL. In the case of the seven head machine, the UTFL constant is "0", and in the case of the four head machine, the UFTL constant is "C".

If a block 174 no underflow had been indicated, then blocks 176, 178, 180, 182 and 184 are skipped. In either event, continuing with block 186, the first slice flag is set. Next, a block 188, an indication is made whether or not Kanji is being printed. This can be done by looking at the most significant four bits of the address read from the text buffer. If these four bits are 4 or 5, Kanji is being printed. Otherwise, Gaiji is being printed. If Kanji is determined to be printed, block 190 indicates that the SLNUM and SOVFL registers are cleared and the first byte of the Kanji address obtained from the text buffer is sent to control logic 78, and latched in a slice pointer register therein. In addition, a "1" is added to the SLP3 register where the second pass is occurring. The SLPO, SLP1 and SLP2 registers contain the twelve bit address accessing one block of memory which stores the 18 slices defining one Kanji character. The SLP3 register is used as a pointer to the particular slice involved. In the particular embodiment described herein, there are actually two blocks of memory which define one Kanji character. The first 15 slices, 1 through 15, are defined in one block and the last three, or slices 16, 17 and 18, are defined in a second block. The two most significant bits of the SLP 1 register are zeroed out and transferred to the two most significant bits of the SLP 3 register to define this second block. The two least significant bits of the SLP 3 register are then incremented to define which particular slice of the second block is of concern.

If at block 188, it was determined that Gaiji was to be printed, then block 192 indicates that the Gaiji address is stored in the slice pointer registers SLPO. SLP1, SLP2 and SLP3. A "1" is stored in the SLNUM register and the SLP 3 register is adjusted for the second pass by adding a "1" thereto. Finally, the storage 72 is enabled to allow the Gaiji information to be read from the read/write storage portion thereof. Whether block 190 or 192 was executed, a continuation occurs with the routine WKLOOP 1 shown in FIG. 12.

Figure 12A:
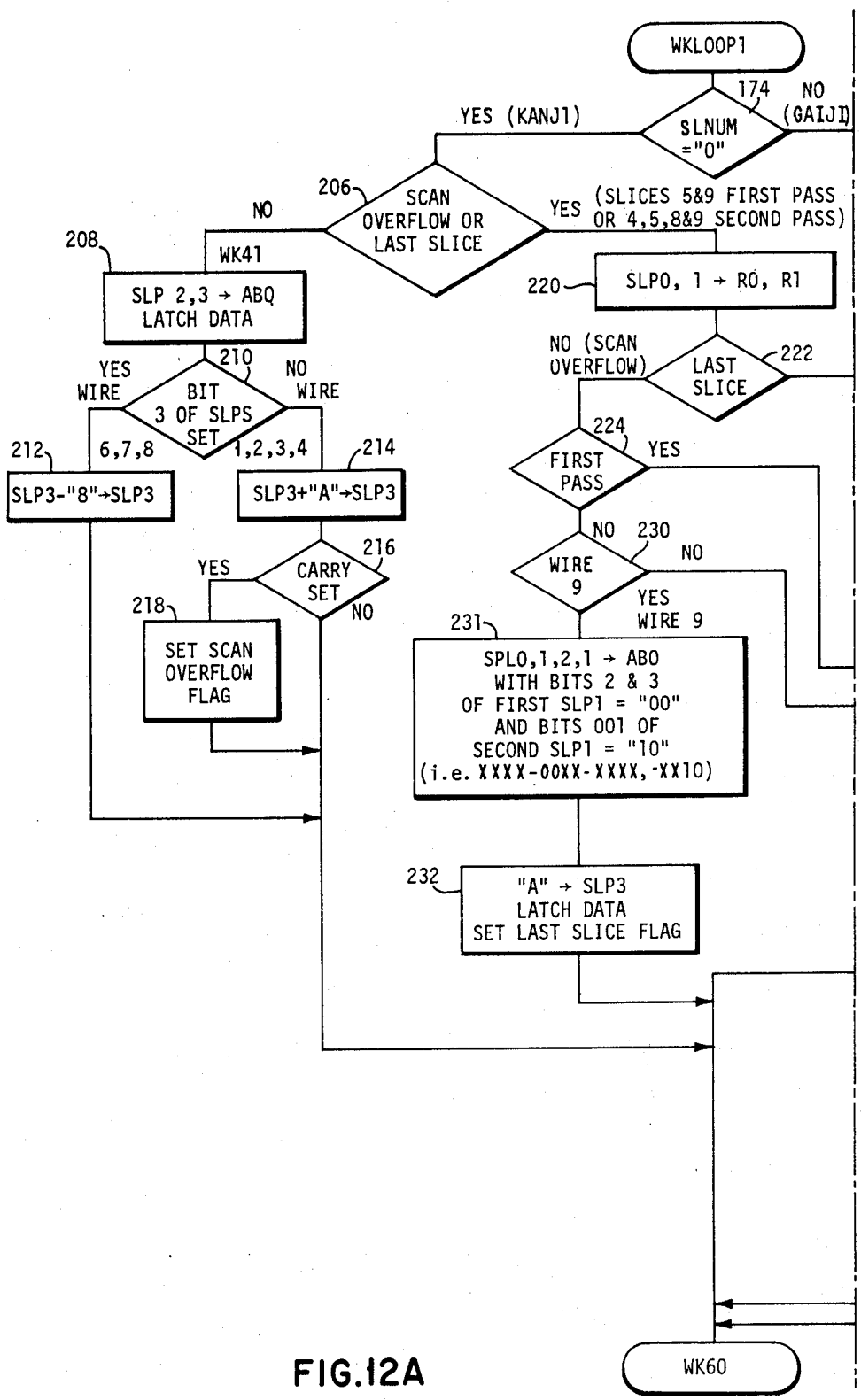
Figure 12B:
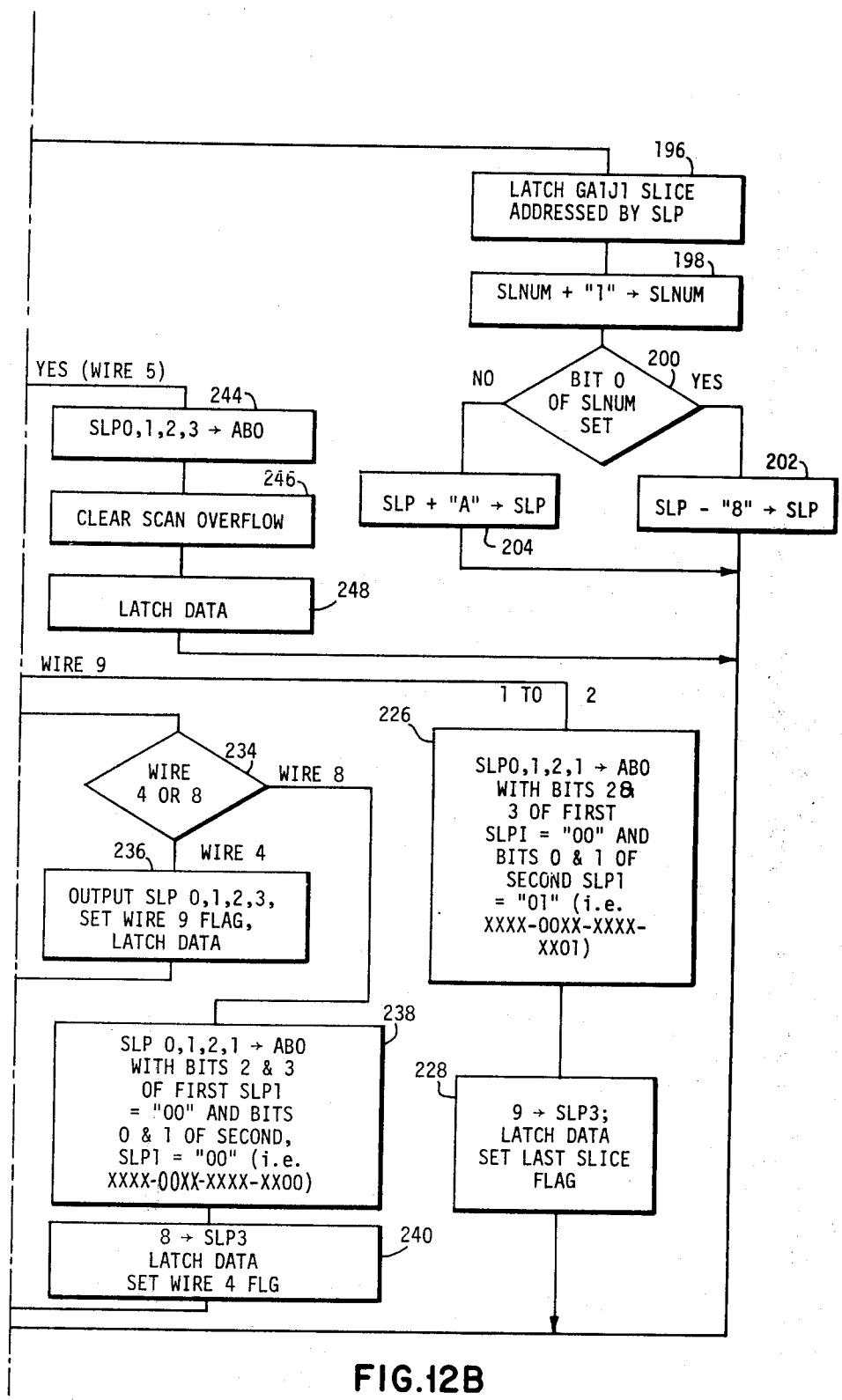
Figure 13A:
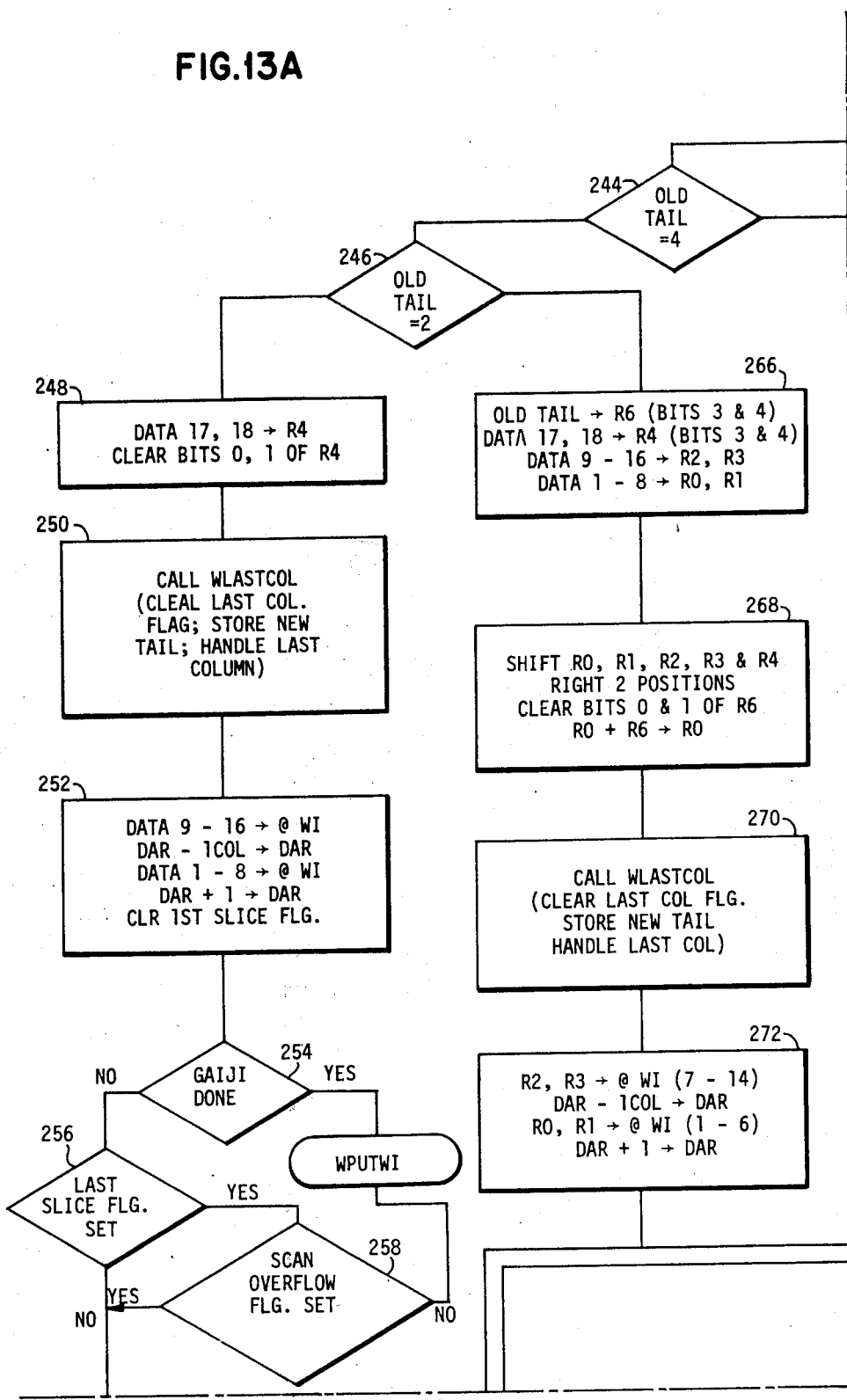
Figure 13B:
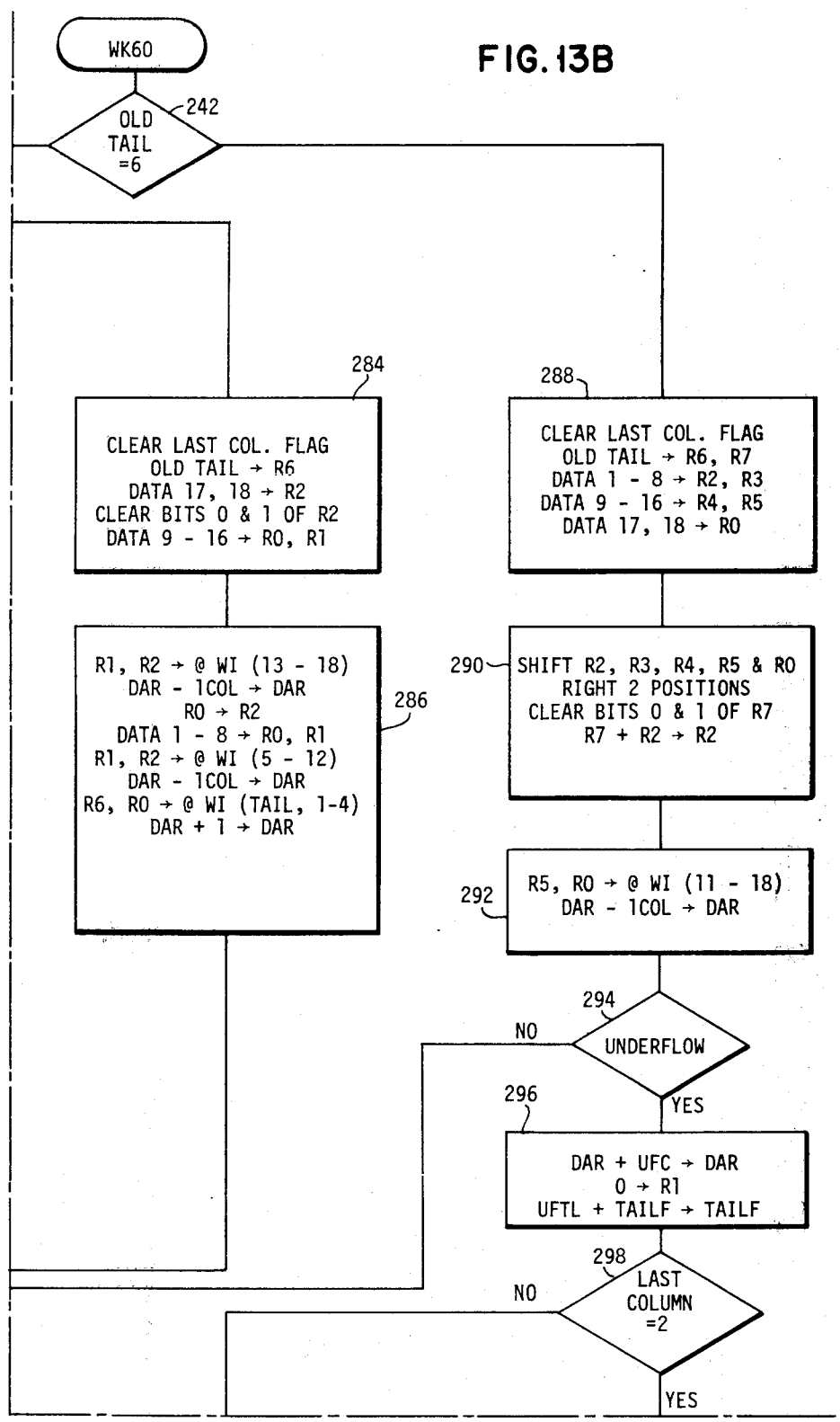
Figure 13C:
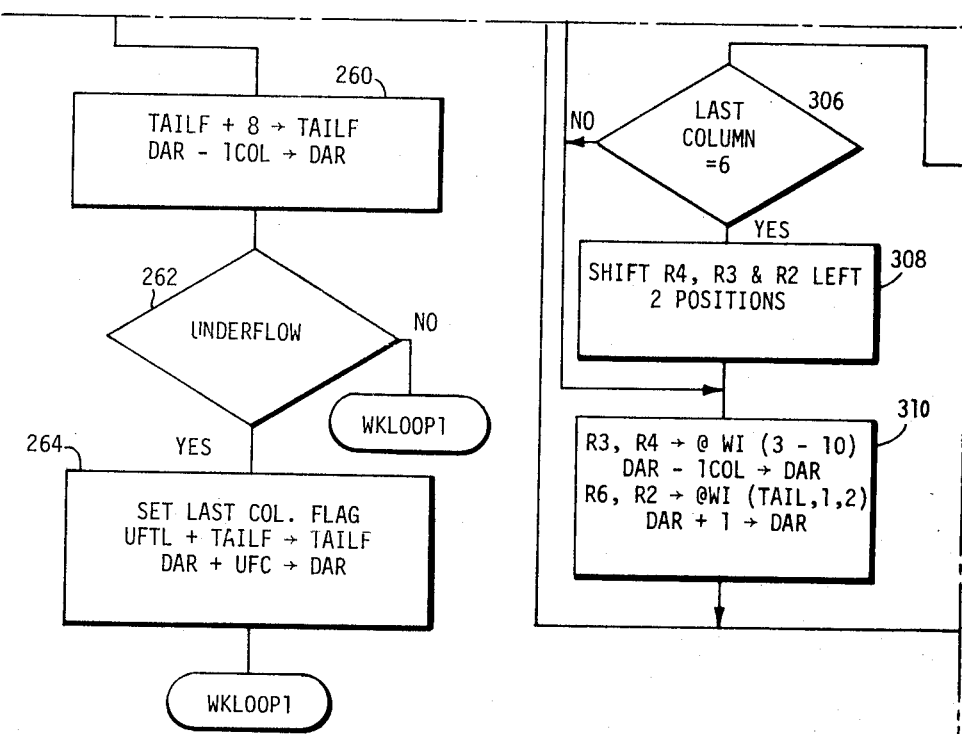
Figure 13D:
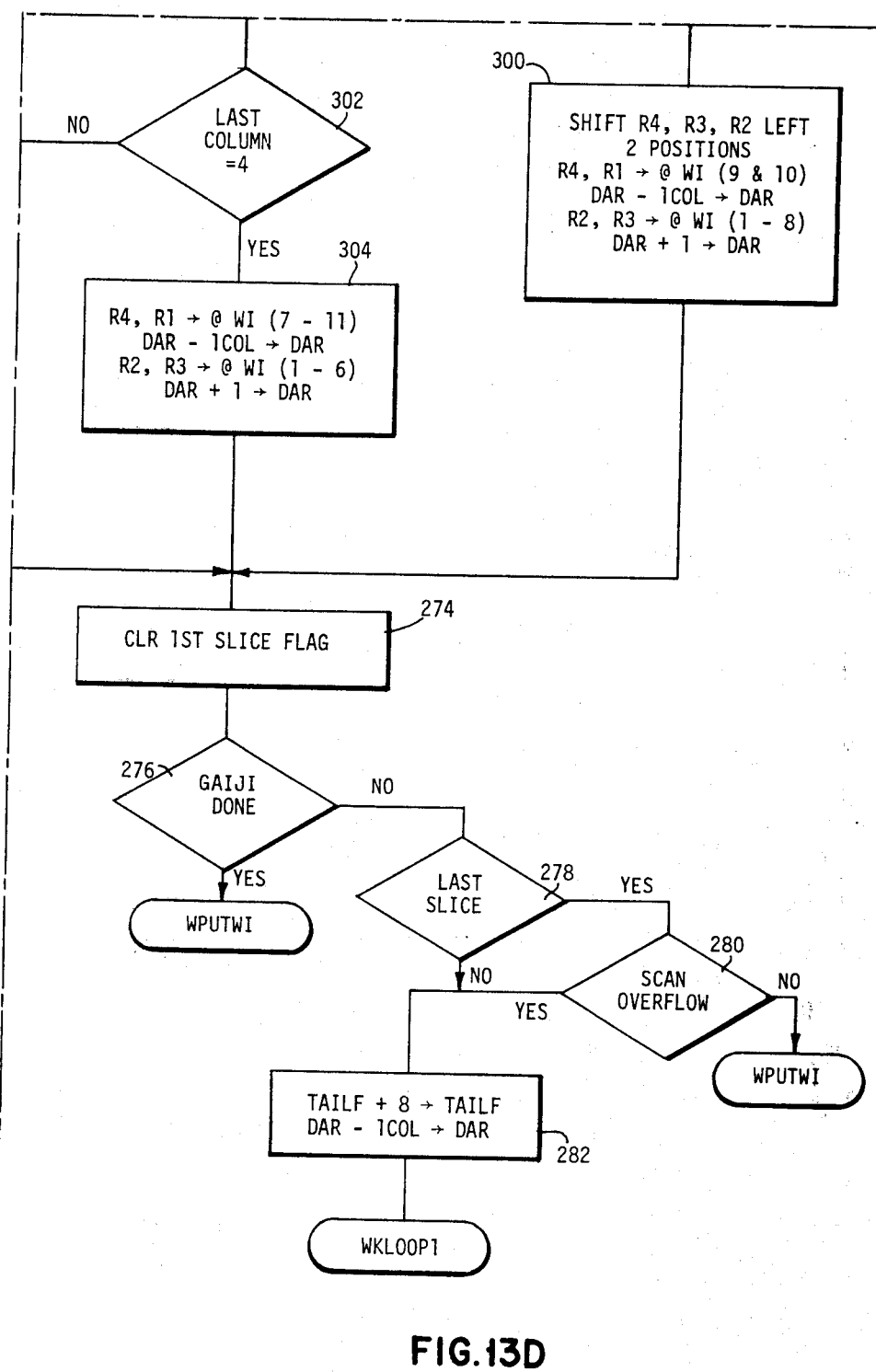

Referring now to FIG. 12, WKLOOP1 routine will be described. This routine is used to latch one slice of information from storage 72 in data register 80 and to set the slice pointer SLP0, 1, 2 and 3 for the next slice. When a slice of data is read from storage 72, it is held in data registers 80 and the WK60 routine, shown in FIG. 13, then takes that data and store in wire image storage 70. In the WKLOOP1 routine shown in FIG. 12, a number of different events can occur. First, if Gaiji is to be printed, then one set of events occurs. If Kanji is to be printed, a determination must be made of which wire is being operated upon and if it is wires 9 or 5, in the case of a first pass, or 8, 4, 9 or 5, in the case of a second pass, special operations must take place due to the organization of the read only memories containing the Kanji slices, and in particular due to the second block containing slices 16, 17 and 18.

The WKLOOP1 routine begins with block 194, which indicates that a determination is made whether the SLNUM register equals zero. If not, thereby indicating that GAIJI is to be printed, block 196 indicates that one Gaiji slice, as addressed by the address in the SLP0 through SLP3 register is read from the read/write storage portion of storage 72 and latched into data register 80. Next, block 198 indicates that the SLNUM register is incremented by 1. Block 200 indicates that a determination is next made of whether bit position 0 of the SLNUM register is set. If it is, thereby indicating an odd number slice, then block 202 indicates that the hexidecimal number "8" is subtracted from the value stored in the slice pointer registers, and a continuation occurs with the WK60 routine in FIG. 13. If at block 200 bit position 0 of the SLNUM register was not "1" indicating an even slice, then the number "A" is added to the slice pointer registers and a continuation occurs with the WK60 routine.

If a block 194 it is determined that the SLNUM register is equal to zero, then an indication that Gaiji is to be printed is made, and a continuation occurs with block 206 where a determination is made whether the scan overflow or the last slice flags are set. The scan overflow flag is set when the row for wire 4 is being filled during the first pass or the rows for wire 3 is being filled during the second pass. The last slice flag is after the data for wire 9 is latched in data register 80. If a negative indication is given at block 206, then according to block 208, the address information in the SLP2 and SLP3 registers is provided over the address bus to control logic 78. It should be recalled that at block 190 in FIG. 11, the first byte of address was applied and the data in the SLP2 and SLP3 registers is the second byte of address. Control logic 78 accesses the information in storage 72 and the data read is latched in data registers 80. Then, according to block 210, a determination is made whether the most significant bit, or bit 3, of the SLP3 register is set. If it is, thereby indicating wires 6, 7 and 8 are being filled, then according to block 212, hexidecimal "8" is subtracted from the SLP3 register and a continuation occurs with the WK60 routine. If at block 210, it was determined that bit 3 of the SLP3 register was not set, thereby indicating that one of wires 1, 2, 3 and, if the first pass, 4 are being filled, then, according to block 214, the hexidecimal "A" is added to the SLP3 register. Next, according to block 216, a determination is made whether the carry indicator has been set. If it has, the scan overflow flag is set. If no carry occurs, or after the scan overflow flag is set, then a continuation occurs with the WK60 routine in FIG. 13.

If at block 206, it has been determined that either one of the scan overflow or the last slice flags are set, thereby indicating that data for wires 5 and 9, in the case of a first pass, or 8, 4, 9, and 5, in the case of a second pass, is to be written into wire image storage 70, then block 220 indicates that the data stored in the two most significant slice pointer registers SLP0 and SLP1 is transferred to internal registers R0 and R1. Then at block 220, a determination is made whether the last slice flag is set. If not, thereby indicating that the scan overflow flag is set, then at block 224 an indication is made whether or not the first pass is occurring. If it is the first pass, then wire 9 information is to be filled and, according to block 226, the address information in the SLP0, 1 and 2 and the SLP 1 again register, is sent over the address bus to control logic 78. In this case, bit positions 2 and 3 of the first SLP 1 register are set equal to "00" and bits positions 0 and 1 of the second SLP1 are set equal to "01". Thus, a signal in the form of XXXX-00XX-XXXX-XX01 is sent to indicate that slice 17 is to be addressed from storage 72 which falls in the second portion of the storage. Next, according to block 228, a hexidecimal "9" is stored in the SLP3 register and the data addressed by control logic 78 is latched into data register 80. Finally, the last slice flag is set.

If at block 224 it had been determined that it was not the first pass, and thus the second pass, then block 230 determines whether or not the slide for wire 9 is being processed. If so, block 231 indicates that the SLP0, SLP1, SLP2 and, again the SLP1 information is sent over the address bus to the control logic 78 to address read only memory portion of storage 72. In this case, bit positions 2 and 3 of the first SLP1 byte are set equal to "00" and bit positions 0 and 1 of the second SLP1 byte would be set equal to "10". This addresses slice 18 stored in the read only portion of storage 72. Next, according to block 232, the hexidecimal number "A" is stored in the SLP3 register and the data read from storage 72 is latched into data register 80 and the last slice flag is set.

If at block 230, it was indicated that a slice for wire 9 was not being processed, then slices for either wires 4 or 8 are to be processed. In this case, block 234 indicates that a determination is made whether the wire 4 or wire 8 slice is to be processed. If the wire 4 slice is being processed, block 236 indicates that address information in the SLP0, through SLP3 registers is sent out over the address bus and the wire 9 flag is set, so as to be detected at block 230 on the next execution of routing WKLOOP1. Finally, the data is latched into data register 80. Thereafter, a continuation occurs with routine WK60 in FIG. 13.

If at block 234, it had been determined that the wire 8 slice were being processed, then block 238 indicates that the address on the SLP0, SLP1, SLP2 and SLP1 registers is sent over the address bus to control logic 78. In this case, bit positions 2 and 3 of the first SLP1 register code is set equal to "00" and bit positions 0 and 1 of the second SLP1 registers code is set equal to "00", thereby defining slice 16. Next, according to block 240, the SLP3 register is set equal to "8", the data is latched into data register 80 from storage 72 and the wire 4 flag is set so as to be detected at block 234 on the next execution of the WKLOOP1 routine.

Referring now to FIG. 13, the WK60 routine will be described. In this routine, the data latch in data register 80 is either stored in wire image storage 70 location or in a tail table contained in CMA storage 76. In addition, information previously stored in the tail table is stored in wire image storage 70. The particular portion of the WK60 routine which is executed depends on the length of the tail. In the case of the seven head machine for which the memory map in FIGS. 14A through 14D is to be built, a tail of either 0 bits or 4 bits will occur. Referring to the first Kanji word, which is characters 1 and 2, and particularly to the wire 1, head 1 slice thereof, which is found at locations "5A0" and "5E8" in FIG. 14B, it is seen that the high eight bits of character 1 are stored in location "5A0", and the low two bits of character 1 and the high six bits of character 2 are stored in location "5E8".

The low four bits of character 2 are then stored in the tail table contained in CMA storage 76. When characters 3 and 4 are to be stored on the first execution of the WK 60 routine for the next character, the information contained in the tail table is stored as the high four bits of location "630". The four high bits of character 3 will then be stored in the low four bits of location "630" and the low six bits of character 3 will then be stored in location 678 together with the high two bits of character 4. Finally, the low eight bits of character 4 will be stored in location "6C0". Thus, one could say that prior to the time character 1 is stored, there is a zero bit tail and prior to the time character 3 is stored, there is a four bit tail since four bits of character 2 had not yet been stored in wire image storage 70.

As will be seen hereafter with respect to FIGS. 15A through 15D, it is also possible to have two bit and six bit tails. Further, in the case of ANK characters, which consist of only ten bits, such as character 1, it is possible to have tails of either 0, 2, 4, or 6 bits.

Referring now to the WK60 routine in FIG. 13, first a determination at block 242 is made whether the old tail is equal to six. If not, a determination is made in block 244 whether the old tail is equal four. If not, a determination is made at block 246 whether the old tail is equal to two. If the old tail is not equal to two, then by implication it must be equal to zero and at block 248 communications microprocessor 64 causes data bits 17 and 18 stored in data register 80 to be transferred thereto and stored in the two most significant bit positions of internal register R4. The two least significant bit positions of register R4 are then cleared. Next, according to block 250, the WLASTCOL routine is called to clear the last column flag, if set, and the new tail is stored in the tail table. In addition, if there is a last column situation, this is handled. The WLASTCOL routine is shown in FIG. 11 and will be discussed hereafter. The new tail is the data stored in register R4 with the actual data bits 17 and 18 being in the two most significant bit positions of register R4 and the two least significant bit positions have been made equal to "0". These two least significant bit positions represent columns 19 and 20 separating characters, which are to be left blank.

Next, according to block 252, the data bits 9 through 16 are stored in the wire image at the address defined in the DAR. The a in block 252, and other blocks as well, indicates that the data is stored in the wire image storage 70 at an address defined by the code in the DAR. It should be recalled that for the first time through the WK60 routine for a new line this address is 5E8, so data bits 9 through 16 are stored in location "5E8". Bits 9 to 16 represent the low two order bits 9 and 10 of character plus the 6 high order bits 11 to 16 of character 2. Next, the constant 1COL is subtracted from the DAR; in the case of FIGS. 14A through 14D, this constant is hexidecimal "048" and the DAR will then contain the address "5A0". Then, data bits 1 to 8 are stored at that address. Thus, bits 1 through 16 are stored at addresses "5A0" and "5E8" and data bits 17, 18 and two 0's, for columns 19 and 20, are stored in the tail table. Finally, according to block 252, "1" is added to the DAR and the first slice flag is cleared.

Next, according to block 254, a determination is made whether the Gaiji storage has been finished. This can be accomplished by testing the SLNUM register to determine if it is equal to hexidecimal "A", or, in other words, whether nine previous Gaiji slices have been stored in the wire image. If at block 254 it is determined that the Gaiji is finished, a branch back to the WPUTWI routine shown in FIG. 10 occurs and the address in storage 72 for a new character is obtained from the text buffer.

If it is determined that the Gaiji is not done, and this may be the case if Kanji is being printed as well as the case where all Gaiji slices have not been completely stored, then at block 256 a determination is made whether the last slice flag is set. If it is, then at block 258 a determination is made whether the scan overflow flag is set. If the scan overflow flag is not set and the last slice flag is set, then a branch occurs back to the WPUTWI routine in FIG. 10 and the address code for a new character is obtained from the text buffer. If both the last slice flag and the scan overflow flag are reset, or the last slice flag is not set, then at block 260 the TAILF register is incremented by hexidecimal "8" and the 1 COL constant of "048" in the case of FIG. 14A through 14D is subtracted from the DAR. It should be noted that the two most significant bits of the TAILF register are a tail counter so by incrementing the TAILF register by "8", it indicates that a tail of four is present in the tail table.

It should also be noted that at block 252, the DAR was incremented by "1" after data bits 1 to 8 were stored in wire image storage 70. Thus, when decrementing the DAR by the 1 COL constant of "048", the DAR will contain the address of "559" or, in other words, will be pointing to row 2 of column 20 of FIG. 14B, corresponding to wire 6, for characters 1 and 2. Next, at block 262 a determination is made whether the DAR has gone below "000". This is referred to as an underflow, and occurs only when the DAR had previously been pointing to Column 1. If there is no underflow, then a return to the WKLOOP routing in FIG. 12 occurs and the next slice of data is placed in wire image storage 70.

If an underflow had occurred, then, according to block 264, the last column flag is set and the TAILF register is incremented by the constant UFTL. For a seven head machine having a memory organization shown in FIGS. 14A through 14D, the UFTL constant is "0". In the case of the four head machine having a memory organization shown in FIGS. 15A through 15D, the UFTL constant is equal to "C". In addition, the DAR is incremented by the UFC constant, which for the seven head machine the UFC constant is "6FF" and in the case of four head machine, the UFC constant is equal to "7B3". The UFC constant is used to move the wire image storage pointer address contained in the DAR from the first column towards the right by 23 columns and up nine rows in the case of FIGS. 14A through 14B. Thereafter, a return to the WKLOOP1 routine occurs and the next slice is fetched and stored in wire image storage 70.

If at block 246 it had been determined that an old tail of two existed, then, according to block 266, the old tail is retrieved from the tail table and stored in the two most significant bits of internal register R6. Next, new data bits 17 and 18 are stored in the two most significant bit positions of register R4, data bits 9 to 16 are stored in registers R2 and R3 and data bits 1 to 8 are stored in registers R0 and R1. Then, according to block 268, the data in registers R0, R1, R2, R3 and R4 is shifted right two positions and the two least significant bits in register R6 are cleared. Thereafter, register R6 is added to register R0 so that the two most significant bits in register R0 are the two old bit tail bits and the two least significant bits in register R0 are new data bits 1 and 2. Then, according to block 270, the WLASTCOL routine is called and the last column flag is cleared, if necessary. The new tail of bits 15 to 8 now stored in register R4 is stored in the tail table and any last column situations are handled.

Then, according to block 272, the data stored in internal registers R2 and R3, which is data bits 7 to 14 is stored in wire image storage 70 at the address pointed to by the DAR. The DAR is then decremented by the 1COL constant and the data stored in internal registers R0 and R1, that is, bits 1 to 6, plus the two old tail bits is stored in wire image storage 70. Thereafter, the DAR is incremented by 1 and a continuation at block 274 occurs.

At block 274, the first slice flag is cleared, if set, and then at block 276, a determination is made whether the Gaiji is done. If so, a branch back to the WPUTWI routine occurs. If not, a branch to block 278 occurs where a determination is made whether the last slice flag is set. If so, at block 280, a determination is made whether the scan overflow flag is set. If the last slice flag is set and the scan overflow flag is not set, then a branch to the WPUTWI routine occurs. Otherwise, or if the last slice flag is not set, a continuation occurs with block 282 where the TAILF register is incremented by "8" and the 1COL constant is subtracted from the DAR and a continuation occurs with the WKLOOP1 routine. Blocks 276, 278, 280, and 282 are similar to blocks 254, 256, 258 and 260, previously discussed in more detail.

If at block 244, it had been determined that the old tail is equal to 4, then a continuation at block 284 occurs. There, the last column flag is cleared and the 4 bit old tail is stored in register R6. Next, data bits 17 and 18 are obtained from data register 80 and stored in the two most significant bits positions of register R2 and the two least significant bit positions of register R2 are cleared. Next, data bits 9 through 16 are obtained from data register 80 and stored in registers R0 and R1. Then, according to block 286, the data in registers R1 and R2 is stored in the wire image. This corresponds to bits 13 and 18, plus the two blank bits representing columns 19 and 20. Thereafter, the DAR is decremented by the 1CO1 constant, the information in register R0 corresponding to bits 9 to 12 is transferred to register R2 and the data bits 1 to 8 are stored in registers R0 and R1. Then, the information in registers R1 and R2 is stored in the wire image storage 70. This corresponds to bits 5 to 12.

Thereafter, the DAR is decremented by the 1COL constant and the four tail bits in register R6 and bits 1 to 4 in register R0 are stored in the wire image storage 70 and the DAR is incremented by 1. Thereafter, continuation at block 274 occurs, where a branch back to the WKLOOP1 routine occurs to process the next slice or a branch back to the WPUTWI routine occurs to process the next character.

If at block 242 it had been determined that the old tail was equal to 6, that is the two most significant bit positions of the TAILF register were equal to "11", then according to block 288, the last column flag is cleared and the old tail is retrieved from the tail table and stored in registers R6 and R7. Thereafter, the data bits 1 to 8 are stored in registers R2 and R3, the data bits 9 through 16 are stored in registers R4 and R5 and data bits 17 and 18 are stored in registers R0. Then, according to block 290, registers R2, R3, R4, R5 and R0 are right shifted two positions and bit positions 0 and 1 of register R7 are cleared. Then, register R7 is added to register R2 with the results being stored in register R2. Thus, register R2 contains the bits 5 and 6 of the old tail plus bits 1 and 2 of the new data, register R3 to R5 contain bits 3 to 14 of the new data, register R0 contains bits 15 to 18 of the new data and register R6 contains bits 1 to 4 of the old tail.

Next, according to block 292, the data stored in register R5 and R0, which corresponds to data bits 11 to 18, is stored in wire image storage 70 and the DAR is decremented by the 1COL constant. Then, according to block 294, a determination is made whether an underflow has occurred as a result of decrementing the DAR. The underflow occurs only when the information just stored is in the column 1. If no underflow occurs, then block 310 indicates that the contents of registers R3 and R4 (data bits 3 to 10) are stored in wire image storage 70, the 1COL constant is subtracted from the DAR, the contents of registers R6 and R2 (old tail bits 1–6 and data bits 1 and 2) is stored in the wire image storage 70, and finally the DAR is incremented by one. Then a continuation at block 274 occurs.

If the underflow occurs at block 294, then according to block 296, the DAR is incremented by the UFC constant and register R1 is cleared. In addition, the TAILF register is incremented by the UFTL constant, which is equal to "0" for the seven head machine and equal to "C" for the four head machine.

Next, according to block 298, a determination is made whether the last column, that is Column 25, in FIGS. 14B and 14D or Column 44, in FIGS. 15B and 15D, has two bits stored therein. If this is the case, then according to block 300, the information in registers R4, R3 and R2 is left shifted two positions and the information in register R4 and R1, which now corresponds to the wire image bits 9 and 10, is stored in the last column. Thereafter, the DAR is decremented by the 1COL constant and the information contained in registers R2 and R3, which corresponds to wires 1 to 8, is stored in the next to last column. Finally, the DAR is incremented by 1 and a continuation at block 274 occurs where a branch back to either the WKLOOP1 or WPUTWI routine occurs.

If at block 298 it had been determined that there were not two bits in the last column, then, according to block 302, a determination is made whether there are four bits in the last column. If so, block 304 indicates that the information in the R4 and R1 registers is stored in the last column of wire image storage 70, the DAR is decremented by the 1COL constant and the information stored in registers R2 and R3 is stored in the second to last column of wire image storage 70. Finally, the DAR is incremented by 1 and a continuation at block 274 occurs.

If at block 302 it was determined that the last column did not contain four bits, then block 306 indicates a determination is made whether the last column contains six bits. If this is the case, then block 308 indicates that the contents of registers R4, R3 and R2 are left shifted two positions thereby losing the two most significant bits of the tail. Thereafter, block 310 indicates that the data is registers R3 and R4, is stored in the last column of wire image storage 70, the DAR is decremented by the constant 1COL, and the information stored in registers R6 and R2 (four bit tail and data bits 1-4) is stored in the next to last column of wire image storage 70 and finally the DAR is decremented by 1.

If at block 306 it had been determined that the last column did not equal six, and therefore by implication equaled eight, then a branch to block 310 occurs, and the information in registers R3 and R4 is stored in the wire image and the information in registers R6 and R2 is stored in the wire image storage 70. After the execution of block 310, a continuation occurs at block 274, where a branch back to either the WKLOOP1 or WPUTWI routines occur.

Referring again to FIG. 11, the WLASTCOL routine will now be explained. First, a determination is made at block 312 whether the last column flag is set. If not, block 314 indicates that a determination is made whether the next character is Kanji. If it is, then according to block 316, register R5 is cleared and the new tail is stored in the tail table, which is contained in CMA storage 76. The tail table may be nine bytes of information and a pointer is used to point to the byte associated with a particular row or wire. The pointer will point to the byte depending on the row being processed of the particular head. Thus, when wire 1 of head 1 is being processed, the pointer will point to the first byte of the tail table. When wire 6 is being processed, the pointer will point to the second byte of the tail table, and so forth. After the execution of block 316, a return to the main program occurs.

If at block 314 it had been determined that Kanji was not being printed, then according to block 318, a determination is made whether the first slice is being stored. If not the first slice, then block 316 is executed. However, if the first slice is being stored then according to block 320, register R5 is cleared, the tail table is cleared, and the DAR is incremented by the 1COL constant. Thereafter, a continuation occurs in block 322 where the new tail is stored in wire image storage 70 and the DAR is decremented by the 1COL constant and return to the calling program occurs.

If at block 312, it had been determined that the last column flag had been set, then according to block 326 the last column flag is cleared, register R4 is cleared, and the tail table is cleared. Thereafter, a continuation occurs with block 322 by storing the new tail in the wire image storage 70 and the DAR is decremented by the 1COL constant and a return to the calling program occurs.

Now that the flow diagram has been explained, a few examples of storing characters in wire image storage 70 will be given to understand its specific operation. First, for the seven head configuration of print block 50, shown in FIG. 4, a memory map is shown in FIGS. 14A through 14D. The address for the first character to be stored is read from the text buffer at blocks 164 and 170 and stored in the SLP registers and the DAR is set to a value of "5E8" at block 172. Next, the first slice flag is set at block 186 and a branch occurs to the WKLOOP1 routine in FIG. 12. Thereafter, continuing a block 208, the address information is sent to address slice one from storage 72 and the hexidecimal number "A" is added to the SLP3 register since wire 1 is being operated upon. Since this does not cause carry to be set, a branch of the WK60 routine in FIG. 13 occurs.

The old tail is determined to be equal to 0 at blocks 242, 244 and 246, so blocks 248, 250 and 252 are executed causing characters 1 and 2 to be stored at locations "5A0" and "5E8". In addition, a 4 bit tail is stored in the tail table by the WLASTCOL routine in FIG. 11, which is called at block 250. During the storage of the first slice in wire image storage 70, the DAR is decremented by the 1COL constant after bits 9 to 16 are stored and incremented by "1" after bits 1 to 8 are stored. Thereafter, at block 260, the DAR is decremented by the 1COL constant so that it now points to location "559". Then a return back to the WKLOOP1 routine occurs to process slice 11, which is the slice corresponding to wire 6 on the first pass. At block 208 the address for slice 11 is sent over the address bus to control logic 78 to cause slice 11 to be latched into data register 80. At this point, bit position 3 of the SLP3 value is equal to "1", and thus according to block 212, the number "8" is subtracted from the SLP3 value making it equal to "3".

Then a continuation with the WK60 routine occurs where it is determined that the tail is equal to "4" since during the previous execution at block 260, the TAILF register has been incremented by "8". Then, execution continues with block 284 and block 286, in which case the data bits 13 to 18 and the two 0's representing columns 19 and 20 are stored in location "559", the DAR is decremented by the 1COL constant of "048", data bits 5 to 12 are stored at location "511", and the old tail, which is zero for the first word, plus data bits 1 to 4 are stored at location "4C9". Thereafter, the DAR is incremented by "1" and is again decremented at block 282 so as to point to location "482". Also, the TAILF register is incremented by "8", so that the two most significant bits thereof are "00" indicating a zero tail. A branch back to WKLOOP1 results in storing the next slice (slice 3) of characters 1 and 2 in locations "43A" and "482". This same procedure continues for storing slices 13, 5, 15 and 7 in wire image storage. During the time slice 7 is stored at locations "16E" and "1B6", when "A" is added to the SLP3 value at block 214, it overflows and the carry indicator is set. Thus, at block 218 the scan overflow flag is set and a continuation at the WK60 routine occurs where the characters are stored in locations "16E" and "1B6" and the DAR is decremented to point to location "127" and a return to the WKLOOP1 routine occurs.

At this point, the test at block 206 indicates that the scan overflow flag is set, so new addresses must be sent to storage 72 to read slice 17. Since the last slice flag is not set and a first pass is occurring, a continuation occurs with block 226 to access slice 17 and a 9 is then stored in the SLP3 register. Also, according to block 228, the last slice flag is set to indicate that the next slice will be the last slice of the two characters forming the Kanji word. Thereafter, the information is stored according to the WK60 routine in locations "097", "ODF" and "127" as previously explained and the DAR is incremented to point to location "050" and a branch back to the WKLOOP1 routine occurs.

At this point, at blocks 206 and 222, the last slice flag is set so that a new address again is sent back to the control logic 78 to read slice 9 from storage 72 for the desired character, and the data is latched into data register 80 as indicated by blocks 244, 246 and 248. Also, the scan overflow is cleared so that only the last slice flag remains set. Thereafter, a continuation at the WK60 routine occurs and the character 1 and 2 information is stored in locations "008" and "050" with a 4 bit tail being stored in the tail table. Now, at block 256, since the last slice flag is set and at block 258, since the scan overflow flag is reset, a branch back to the WPTWI routine occurs so that a new character can be entered into wire image storage 70. It should be noted that block 282 is not executed for the last slice, so that DAR is pointing to location "00A".

After the branch to the WPUTWI routine occurs, the next character code is read, a continuation with the WKANWI routine in FIG. 11 occurs. When the update data which is equal to the 1COL constant of "048" is subtracted from the DAR at block 172, an underflow occurs, the last column flag is set the UFC value of "6FF" is added to the value in the DAR to cause it to contain a value "6C0". Thereafter, characters 3 and 4, corresponding to the second Kanji word are stored in the same manner, with the DAR ending at location "099". A continuation occurs for characters 5 and 6, corresponding to the third Kanji word, with the first Kanji word being stored in the wire 1 location for head 2 at locations "009" and "051". After this, at block 262, a underflow determination is indicated and the last column flag is set and the DAR is incremented by the UFC constant to cause it to point to location "6C1". Thereafter, characters 5 and 6 are loaded into the wires for head 1. This type of loading of wire image storage 70 continues until all of the characters have been loaded. It is noted that the characters are loaded at an angle corresponding to the sloping nature of the wires in the print block 50.

It is also noted that in the case of the seven head print block 50 and FIGS. 14A through 14D, the only tail which can occur is 0 or 4 bits. Thus, the only portions of the WK60 routine shown in FIG. 13 which are executed are those beginning with blocks 248 and blocks 284. This, however, is not the case for the four head machine, which has a print block 60 shown in FIG. 6 and which has a map of the wire image storage 70 as shown in FIGS. 15A through 15D.

In the case of the four head machine, the DAR is initially set to have an address of "3B1" and characters 1 and 2 are inserted in the same manner as previously described. After the last slice is inserted of characters 1 and 2, a return to the WPUTWI routine occurs, at which the next character address is taken from the text buffer. Then in the WKANWI routine, the DAR has this update data subtracted therefrom and underflows. However, since this is not the last column, the last column flag is not set at block 176. At block 178, the DAR is incremented by the UFC constant of "7B3" so as to point to location "40B" and characters 3 and 4 are then placed in wire image storage 70. This continues until after characters 17 and 18 are placed and wire image storage 70 and the DAR contains the address "38D".

Thereafter, the WPUTWI routine is executed and in the WKANWI routine, at block 172, the update data of "384" is subtracted from the DAR value and the DAR points to location "009". Thus, the test at block 174 indicates there is no underflow and a jump is made to block 186. At this point, it is noted that at block 172, the TAILF register is updated by storing a "C" therein.

Normally, when the underflow occurs at block 184, a constant UFTL which is equal to a "C" in the case of a four head machine is added, causing the TAILF register to contain a "10" value in the two most significant bit positions thereof. However, where no underflow occurs, the TAILF register contains a "11" or "C" in the two most significant bit positions thereof. The routine continues as before through the WKLOOP1 routine to the WK60 routine shown in FIG. 13. At this point, the test at block 242 indicates that the old tail is now equal to 6 since the two most significant bit positions of the TAILF regsiter are "11". Continuing with block 288, the data is obtained and bits 11 to 18 are stored at location "009", as indicated by character 20 being written into Column 1 at the row for wire 1 of head 2. Thereafter, the 1COL constant of "2D" is subtracted from the DAR value and an underflow is detected at block 294. The DAR is then updated by adding the UFC constant of "7B3" so that the DAR contains an address of "78F". In addition, the tail flag is further updated by adding thereto in the UFTL constant of "C". Then at blocks 298, 302 and 306, a test is made of the last column by testing the value of the UFTL constant. In this case, the UFTL constant is equal to "C" and the test is positive at block 306. Thus, the information in registers R4, R3 and R2 is left shifted to positions and at block 310, the information in registers R3 and R4 is stored in the wire image storage 70 at location "78F". In this case, the information stored is bits 5 to 10 since only the low order 6 bits of character 19 are to be stored. Thereafter, the 1COL constant is subtracted from the DAR and the information contained in registers R6 and R2 is stored at location "762". This corresponds to the 4 tail bits left over from character 18 plus bits 1 to 4 of character 19. Thereafter, continuation at block 274 results in a branch back to the WKLOOP1 routine and the remaining slices of characters 19 and 20 are stored. After characters 19 and 20 are stored, the DAR is set to point to location "063" and the slices for characters 21 and 22 are stored. However, in this case, the slices for characters 21 and 22 while being stored for head two have tails of 2 and 6. After the underflow and the correction factors are added, the slices of characters 21 and 22 for head 1 have tails of 0 or 4. This same procedure continues with the slices being placed in head 1 or head 3 having tails of 0 or 4 bits and the slices being placed in heads 2 and 4 having tails of 2 bits or 6 bits.

Referring again to FIG. 8 and 9, the manner in which the bits are read from wire image storage 70 will now be described. In the wire image, as shown in FIGS. 14A through 14D and 15A through 15D, each bit column consists of the images applied to the 63 wires at one given incremental position of point block 50 or point block 60. Thus, as print blocks 50 or 60 move, the bits are read out, a bit column at a time for each incremental movement. The incremental movement is determined by print emitter 56 which allows a pulse, or print emitter signal to be provided for each 0.01 inch movement of print block 50 or print block 60.

FIG. 8 includes in addition to the elements previously discussed HIG control latches 328 which respond to the HIG LOAD 2 signal from decode 108 and the CTA data bus out, lines 0 through 4. The HIG LOAD 2 signal is provided each time a point emitter 56 pulse is detected. The HIG control latches provide the INIT signals, the THIN signal and BIT SEL signals 1-3. The INIT and THIN signals are those defined by the data on the data bus at the time the HIG LOAD 2 signal is provided and can be either "0" or "1" signals. The bit select lines 1 through 3 contain a binary code of zero through 7 and are applied to the select input of 8:1 select logic 84. Logic 330 is responsive to the HIG LOAD 2 signal and the CMA RST reset signal from communications microprocessor 64. The CMA RST signal occurs once each cycle of the microprocessor 64 operation. Logic 330 provides the CLR CNTR signal to clear HIG state counter 334 from the time the HIG LOAD 2 signal is provided until the leading edge of the CMA RST signal occurs. This is shown in FIG. 9. Logic 30 also provides the EN CLK signal to disable the HIG clock 338 during the time the clear counter signal is provided. Logic 332 responds to a STOP HIG signal provided from HIG state counter 334, which is low during the time the HIG is being read. In addition, logic 332 responds to the CMA AHS (address high select) signal from communications microprocessor 64 which is provided whenever microprocessor 64 is not fetching an instruction. Logic 332 provides the HIG ENABLE signal shown in FIG. 9 and the RUN HIG signal.

The RUN HIG signal and the EN CLK signals are applied through AND gate 336 to the data input of HIG clock 338. The select signal from communications microprocessor 64, which is shown in FIG. 9, is provided to clear HIG clock 338 and an 8 megahertz clocking signal is provided to the clock input of HIG clock 338. HIG clock 338 may be a shift register with the third stage providing the SHIFT signal, the fourth stage the WR CYCLE signal, the fifth stage the WR ENABLE signal, and the sixth stage the COUNT signal. These four signals are shown respectively in FIG. 9. Initially the output of AND gate 336 goes high causing a "1" bit to be shifted through HIG clock 338. As is seen in FIG. 9, the leading edge of each of the SHIFT, WR CYCLE, WR ENABLE and COUNT signals occurs respectively later in time. The trailing edge of each cycle is controlled by the occurrence of the CMA SEL select cycle from communications microprocessor 64.

HIG state counter 334 is a binary counter having a clear input and a count input. The COUNT pulse from HIG clock 338 is provided to the count input of HIG state counter 334 and the CLR CNTR signal from logic 330 is applied to clear HIG state counter 334. Each time a COUNT signal occurs, the count in HIG state counter 334 increases. Prior to reading information from wire image storage 70, the CLR CNTR signal clears HIGH state counter 334.

The WR CYCLE and WR ENABLE signals from HIG clock 338 are applied to logic 340, together with the three low order HIG state counter 334 outputs. Logic 340 provides a WR signal to the write input of 16 bit by 8 bit read/write storage 346. Storage 346 may be a fast random access memory and each time a signal is applied to the write input thereof, the information applied to the data input is written into the location defined by the code applied to the ADDR, or address, input thereof. The signal applied to the ADDR input of storage 346 is proviced from 2:1 select logic 342, which responds to the HIG state lines 3 through 6 and to lines 4-7 of the address bus from control microprocessor 66. The HIG state lines 3 to 6 determine where information is to be written into read/write storage 346 and the address bus lines from control microprocessor 66 determines where information is to be read from read/write storage 346. Select circuit 342 operates until HIG state counter 334 overflows to its eight stage, causing a STOP HIG signal to be applied. The STOP HIG signal is also applied through logic 332 to turn off the HIG state clock. The data provided to storage 346 is provided from shift register 344 eight bits at a time. Shift register 344 has a data input, a clear input, and a clock input. The INIT signal is applied to clear shift register 334 and the SHIFT signal from HIG clock 338 is applied once each cycle to clock in one bit of data applied to the data input of shift register 344. The signal provided to the data input of shift register 344 comes from AND gate 352. Assuming for the moment that AND gate 352 is enabled by the output signal from AND gate 350, the information read from wire image storage 70 is provided 1 byte at a time through select circuit 84. The reading of information from wire image storage 70 is initiated by control microprocessor 66 addressing a particular byte column of wire image 70 by placing the address for that byte column on its data bus out. This sets HIG SAR counter 126' to provide the storage address for that byte column on the HIG SAR bus. Each time the count signal is provided, HIG SAR counter is incremented and thus the next byte of the byte column is addressed by the HIG SAR bus. The HIG SAR bus is applied to 2:1 select 128 and if the HIG enable signal is provided by logic 332, 2:1 select provides the HIG SAR address to wire image storage 70.

One bit of the byte addressed by the HIGH SAR bus and applied to 8:1 select "84" is selected by the code of the BIT SEL 1-3 signals, applied through AND gate 352 and shifted into register 344. In reading wire image storage 70, HIG SAR counter 126 in response to information over the control microprocessor 66 data bus selects a particular column, as shown in FIGS. 14A through 14D or FIG. 15A through 15D. Then each byte in that column is read one at a time as the HIG SAR counter count is incremented and defined by the lines HIG SAR 1 through 10. A particular bit out of the byte read is isolated by 8:1 select logic 84 and this isolated bit is defined by the BIT SEL lines 1 through 3 latched into HIG control latches 328 by control microprocessor 66 data bus out and the HIG LOAD 2 signal. The HIG SAR counter 126 counts from the initial value loaded by CTA to that valve plus 63. Thus 64 bytes of information are read. The desired bit is selected from each of those bytes and stored in 64 of the 128 bits locations of storage 346. Thereafter, the desired number of bits which in the case of the seven head machine is 63, are read from storage 346 by the control microprocessor 66 and applied over the data bus in to control microprocessor 66 or directly to the head latch circuit 96.

For certain types of applications where the velocity of the movement of head block 50 or 60 is increased, it becomes impossible to print two adjacent dots. This especially is the case when printing ANK type characters. Whenever it is desired to print in this mode, the THIN bit is caused to be logic 1. This bit is applied to AND gate 350. A second input to AND gate 350 is from 8:1 select circuit 348 which receives the data on the control microprocessor 66 data bus in and HIG STATE signal 0 through 2 from HIG state counter 334. Here if a "1" bit is provided at the output of storage 346 and is selected by HIG state lines 0 to 2, a "1" bit is applied to AND gate 350. If the THIN bit is "1", then the output of NAND gate 350 is "0" and AND gate 352 is disabled. Thus, no matter what the information stored in wire image storage 70, it cannot be provided to shift register 344. In this manner, controlling the actuators to fire only upon every other dot is maintained.

In operation, control microprocessor 66 addresses one column of wire image storage 70 and each time a print emitter 56 pulse is detected, a particular bit column selected by 8:1 select logic 84 is read from wire image storage 70 and stored it in read/write storage 346. After 64 bits have been written into read/write storage 346, control microprocessor provides address signals to obtain one byte at a time of sixty three bits. This continues until all eight bit columns of the byte column have been read and provided through read/write store 346. Then microprocessor 66 addresses the next byte column and the same thing occurs and so forth until the final bit column is selected and provided to the wire actuators.

What has been described herein is primarily related to the printing of Kanji and Gaiji characters. However, the same scheme is equally useful in printing conventional alphanumerical characters. In this case, each of the character positions shown in FIGS. 14A through 14D and 15A through 15D would represent an individual ANK character rather than one-half of a Kanji or Gaigi character. The scheme for loading wire image storage 70 and for reading therefrom would be substantially the same. Also a line can include both ANK or Kanji characters. Although a first pass has been described as left to right movement of point block 50 or 60, the first pass could as easily be right to left movement and the second pass could be left to right movement. This would be the case when printing one ANK line on a left to right pass and a line of Kanji next.

I claim:

1. A matrix printer for printing matrix characters on a record medium comprising:
   at least one print head which moves across said record medium, said print head including a plurality of printing elements, each of which is operable to cause a symbol to be printed, each character having a plurality of printed symbols in an arranged configuration within a character matrix, said printing elements being positioned with respect to one another along at least one path which is non-perpendicular to said print head movement;
   means for providing data defining the arrangement of said symbols in said character matrix;
   memory means into which data can be stored and from which previously stored data for an entire character can be read;
   means for storing said symbol defining data in said memory means in an order related to said printing element positioning; and
   means for reading the data stored in said memory means in one of a column or row order and for providing said read data to operate said printing elements.

2. The invention according to claim 1 wherein said memory means includes first and second parts, one part having data read therefrom while the other part has data stored therein.

3. The invention according to claim 1 wherein said symbol defining data is provided for a plurality of characters, and said means for storing said symbol defining data stores said data one character at a time.

4. The invention according to claim 1:
   wherein said symbol defining data defines said character symbols serially by one of row or column of said character maxtrix;
   wherein said memory means is organized as a plurality of adjacent addressable locations; and
   wherein said means for storing stores each of said one row or column data in non-adjacent addressed locations such that an operation definition of the printing element to print said symbols is stored in said memory means in adjacent locations for any given position of said print head during its movement.

5. The invention according to claim 1 wherein said symbols are dots.

6. The invention according to claim 1 wherein said printing elements are wires.

7. The invention according to claim 1 wherein said printer includes a plurality of print heads, each including a plurality of printing elements positioned along a path which is non-perpendicular to the path of said print head movement.

8. The invention according to claim 7 wherein said means for storing stores said symbol defining data in said memory means in an order related to both the number of print heads and the positioning of the print elements in each print head.

9. The invention according to claim 1 wherein said memory means includes first and second parts, one part having data read therefrom while the other part has data stored therein.

10. The invention according to claim 9 wherein said symbol defining data is provided for a plurality of characters, and said means for storing said symbol definite data stores said data one character at a time.

11. The invention according to claim 10:
    wherein said symbol defining data defines said character symbols serially by one of row of column of said character matrix;
    wherein said memory means is organized as a plurality of adjacent addressable locations; and
    wherein said means for storing stores each of said one row or column of data is non-adjacent addressed locations such that an operation definition of the printing element to print said symbols is stored in said memory means in adjacent locations for any given position of said print head during its movement.

12. The invention according to claim 11 wherein said symbols are dots.

13. The invention according to claim 12 wherein said printing elements are wires.

14. The invention according to claim 8 wherein said symbol defining data is provided for a plurality of characters, and said means for storing said symbol defining data stores said data one character at a time.

15. The invention according to claim 14:
    wherein said symbol defining data defines said character symbols serially by one of row or column of said character matirx;
    wherein said memory means is organized as a plurality of adjacent addressable locations; and
    wherein said means for storing stores each of said one row or column of data in non-adjacent addressed locations such that an operation definition of the printing element to print said symbols is stored in said memory means in adjacent locations for any given position of said print head during its movement.

16. The invention according to claim 15 wherein said symbols are dots.

17. The invention according to claim 16 wherein said printing elements are wires.

18. The invention according to claim 8:

wherein said symbol defining data defines said character symbols serially by one of row or column of said character matrix;

wherein said memory means is organized as a plurality of adjacent addressable locations; and wherein said frames for storing stores each of said one row or column of data in non-adjacent addressed locations such that an operation definition of the printing element to print said symbols is stored in said memory means in adjacent locations for any given position of said print head during its movement.

19. The invention according to claim 18 wherein said symbols are dots.

20. The invention according to claim 19 wherein said printing elements are wires.

21. In a dot matrix printer for printing a pattern of dots in a matrix format on a record medium including a plurality of operable print elements moveable across said medium along a given line, first memory means for storing bit patterns defining said pattern of dots, an improvement for obtaining signals to be applied to operate said print elements as they move across said medium, wherein said print elements are positioned along a path which is non-perpendicular to said given line, said improvement comprising:

22. The invention according to claim 21 wherein said print elements are wires.

23. The invention according to claim 21 wherein said means for reading reads a byte column one byte at a time and isolates the one bit of each byte corresponding to the then read bit column.

24. In a dot matrix printer for printing a pattern of dots in a matrix format on a record medium including a plurality of operable print elements moveable across said medium along a given line, first memory means for storing bit patterns defining said pattern of dots, an improvement for obtaining signals to be applied to operable said print elements as they move across said medium, wherein said print elements are positioned along a path which is non-perpendicular to said given line, said improvement comprising:
 read/write memory means;
 means for reading said first memory means to obtain data therefrom defining said bit patterns in a row or column order;
 means for storing said data in said read/write memory means in an order such that adjacent locations in said read/write memory means define the operatonal state of said print elements at any incremental point as said print elements move;
 means for reading the data stored in adjacent locations of said read/write memory means to obtain said signals to be applied to operate said print elements;
 wherein said read/write memory means includes at least two portions, one portion having data stored therein by said means for storing while the other portion has data read therefrom by said means for reading; and
 wherein said printer further includes portion control means to control said means for storing and means for reading to alternate between said one and said other portions after all data has been stored and read.

25. In a dot matrix printer for printing a pattern of dots in a matrix format on a record medium including a plurality of operable print elements moveable across said medium along a given line, first memory means for storing bit patterns defining said pattern of dots, an improvement for obtaining signals to be applied to operate said print elements as they move across said medium, wherein said print elements are positioned along a path which is non-perpendicular to said given line, said improvement comprising:
 read/write memory means;
 means for reading said first memory means to obtain data therefrom defining said bit patterns in a row or column order;
 means for storing said data in said read/write memory means in an order such that adjacent locations in said read/write memory means define the operational state of said print elements at any incremental point as said print elements move;
 means for reading the data stored in adjacent locations of said read/write memory means to obtain said signals to be applied to operate said print elements;
 wherein said means for storing includes first programmed processor means and said means for reading includes second processor means;
 wherein said read/write memory means is addressable by bytes, each block of bytes representing a column consisting of a plurality of bit columns and corresponding successive bytes within each column representing a row, and
 wherein said means for reading said read/write memory means reads one bit column at a time.

26. The invention according to claim 25 wherein said first processor means includes
 means for reading said first memory;
 means to obtain data defining said pattern of dots one row at a time and for storing said data defining each row of dots in a corresponding row of at least one byte column location of said read/write memory, the data defining each different row of dots of said dot pattern being stored in a different row and a different column location in said read/write memory.

27. In a dot matrix printer for printing a pattern of dots in a matrix format on a record medium including a plurality of operable print elements moveable across said medium along a given line, first memory means for storing bit patterns defining said pattern of dots, an improvement for obtaining signals to be applied to operate said print elements as they move across said medium, wherein said print elements are positioned along a path which is non-perpendicular to said given line, said improvement comprising:
 read/write memory means;
 means for reading said first memory means to obtain data therefrom defining said bit patterns in a row or column order;
 means for storing said data in said read/write memory means in an order such that adjacent locations in said read/write memory means define the operational state of said print elements at any incremental point as said print elements move;
 means for reading the data stored in adjacent locations of said read/write memory means to obtain said signals to be applied to operate said print elements;
 wherein said printer prints a plurality of characters on a line as said printing elements move, each character including a pattern of dots definable in a matrix format;

wherein said means for reading said first memory means reads the data corresponding to one row of the pattern of dots for one character to be printed;

wherein said read/write memory means has a plurality of sequentially addressable multibit locations, said locations being divided into blocks having an initial addressed location, said blocks representing columns of a matrix and said initial locations and corresponding locations from said initial locations of each block representing rows of said matrix, each row of said represented read/write memory matrix being associated with one print element and each bit column of said represented read/write memory matrix relating to the operational definition of said print elements at a particular location as said print elements move across said medium; and wherein said means for storing stores said data read from said first memory means relating to one row of dots for one character in a row of said represented read/write memory matrix in the columns of said row related to the position of said character in said line.

28. The invention according to claim 27 wherein said means for reading said read/write memory means reads one bit column at a time of said represented matrix.

29. The invention according to claim 28:
wherein said read/write memory means includes at least two portions, one portion having data stored therein by said means for storing while the other portion has data read therefrom by said means for reading; and
wherein said printer further includes portion control means to control said means for storing and means for reading to alternate between said one and said other portions after all data has been stored and read.

30. The invention according to claim 28 wherein said print elements are wires.

31. The invention according to claim 28 wherein said data read from said first memory means and stored in said read/write memory means is a plurality of binary digits having one value for each dot and an opposite value for the absence of a dot in said character matrix.

* * * * *